United States Patent
Minomo et al.

(10) Patent No.: US 10,000,667 B2
(45) Date of Patent: Jun. 19, 2018

(54) MULTILAYER FILM FOR DECORATIVE MOLDING

(71) Applicants: Toray Industries, Inc., Tokyo (JP); Sanyo Chemical Industries, Ltd., Kyoto (JP)

(72) Inventors: Katsuhiro Minomo, Otsu (JP); Kentaro Mori, Otsu (JP); Yosuke Matsui, Kyoto (JP)

(73) Assignees: Toray Industries, Inc. (JP); Sanyo Chemical Industries, Ltd. (JP)

( * ) Notice: Subject to any disclaimer, the term of this patent is extended or adjusted under 35 U.S.C. 154(b) by 0 days. days.

(21) Appl. No.: 15/479,436

(22) Filed: Apr. 5, 2017

(65) Prior Publication Data

US 2017/0204298 A1    Jul. 20, 2017

Related U.S. Application Data

(62) Division of application No. 14/362,277, filed as application No. PCT/JP2012/083384 on Dec. 25, 2012, now abandoned.

(30) Foreign Application Priority Data

Dec. 28, 2011   (JP) .................................. 2011-288235

(51) Int. Cl.
*B32B 25/00*   (2006.01)
*C09J 7/02*   (2006.01)
(Continued)

(52) U.S. Cl.
CPC .............. *C09J 7/0282* (2013.01); *B32B 7/12* (2013.01); *B32B 27/40* (2013.01); *B32B 33/00* (2013.01);
(Continued)

(58) Field of Classification Search
CPC . B32B 27/40; B32B 33/00; B32B 7/12; C09J 7/0267

See application file for complete search history.

(56) References Cited

U.S. PATENT DOCUMENTS

| | | |
|---|---|---|
| 5,045,622 A | 9/1991 | Kohno et al. |
| 7,238,745 B2 | 7/2007 | Roesler et al. |

(Continued)

FOREIGN PATENT DOCUMENTS

| | | |
|---|---|---|
| JP | 2002-226775 A | 8/2002 |
| JP | 2002-322415 A | 11/2002 |

(Continued)

*Primary Examiner* — Michael L Leonard
(74) *Attorney, Agent, or Firm* — DLA Piper LLP (US)

(57) ABSTRACT

A multilayer film includes a protective layer, a color layer and an adhesive layer, with a molding film disposed between either of the adjoining pairs of layers or on an opposite surface of the protective layer to the color layer, wherein the protective layer contains a polyurethane resin (U) formed at least from an active hydrogen component (A) and an organic isocyanate component (B) and having a polycarbonate skeleton with an alicyclic hydrocarbon group and conditions (1) and/or (2) are satisfied:

(1): the polyurethane resin (U) is a polyurethane resin (U1) having an alkoxysilyl and/or a silanol group in a molecule, (2): the protective layer contains a compound (X) having a glycidyl ether and an alkoxysilyl and/or a silanol group, and the polyurethane resin (U) is a polyurethane resin (U2) having an amino group or a carboxyl group and/or a salt thereof.

6 Claims, 1 Drawing Sheet

(51) Int. Cl.
  *B32B 27/40* (2006.01)
  *C08G 18/44* (2006.01)
  *B32B 33/00* (2006.01)
  *B32B 37/12* (2006.01)
  *C08G 18/66* (2006.01)
  *C08G 18/75* (2006.01)
  *C08G 18/08* (2006.01)
  *C08G 18/12* (2006.01)
  *C09D 175/06* (2006.01)
  *C08G 18/32* (2006.01)
  *B32B 7/12* (2006.01)
  *C08G 18/28* (2006.01)
  *C08G 18/38* (2006.01)

(52) U.S. Cl.
  CPC .......... *B32B 37/12* (2013.01); *C08G 18/0823* (2013.01); *C08G 18/12* (2013.01); *C08G 18/3206* (2013.01); *C08G 18/3228* (2013.01); *C08G 18/44* (2013.01); *C08G 18/664* (2013.01); *C08G 18/755* (2013.01); *C08G 18/758* (2013.01); *C09D 175/06* (2013.01); *C09J 7/25* (2018.01); *C09J 7/255* (2018.01); *B32B 2451/00* (2013.01); *C08G 18/289* (2013.01); *C08G 18/3893* (2013.01); *C09J 2201/122* (2013.01); *C09J 2201/162* (2013.01); *C09J 2203/306* (2013.01); *C09J 2467/001* (2013.01); *C09J 2475/00* (2013.01); *C09J 2475/001* (2013.01); *Y10T 156/10* (2015.01); *Y10T 428/2848* (2015.01)

(56) References Cited

U.S. PATENT DOCUMENTS

| 7,642,334 | B2 | 1/2010 | Uchida et al. |
| 2007/0224402 | A1* | 9/2007 | Yoshida ................ B32B 27/08 428/220 |
| 2010/0273930 | A1 | 10/2010 | Shirakami et al. |
| 2011/0112245 | A1* | 5/2011 | Nakamura ......... C08G 18/0823 524/591 |
| 2012/0029146 | A1 | 2/2012 | Matsui et al. |
| 2013/0089731 | A1 | 4/2013 | Imanaka et al. |

FOREIGN PATENT DOCUMENTS

| JP | 2003-212938 A | 7/2003 |
| JP | 2004-299223 A | 10/2004 |
| JP | 2009-149095 A | 7/2009 |
| JP | 2010-260942 A | 11/2010 |
| WO | 2012/002569 A1 | 1/2012 |

* cited by examiner

MULTILAYER FILM FOR DECORATIVE MOLDING

TECHNICAL FIELD

This disclosure relates to a multilayer film for decorative molding used when providing film decoration for decorable objects used in automobile parts, electrical appliances and the like, more specifically, a multilayer film for decorative molding which exhibits a good mold-conformability to decorable objects, even those with deep-draws and other complicated shapes, during decorative molding, and scratch mark resistance, and a polyurethane resin used therefor, as well as a method of producing a decorative molded body.

BACKGROUND

Generally speaking, when it comes to a method to decorate molded products such as automobile parts and electrical appliances, a technique designed to decorate decorable objects by spray-coating multiple layers with different functions such as an adhesive layer, color layer and protective layer one by one to confer durability, esthetic design and the like on them has been adopted. However, there is a problem with such a technique in that, since spray-coating necessitates a baking step, there are more steps than otherwise is the case, the cost is high due to the considerable energy and time involved in heating. To solve this problem, film-based decorating methods capable of decorating three-dimensional decorable objects, such as vacuum molding and air-pressure forming, have been studied in recent years.

Designed to cover the outermost surface of a molded product, the protective layer of a multilayer film for decorative molding used in a film-based decorating method plays an important role in the decoration of a molded product, and, as such, needs to possess durability (for instance, anti-scratching properties (scratch resistance), weather resistance, chemical resistance and water resistance).

In addition, when applying a film-based decorating method to automobile and other parts, mold-conformability during decorative molding is essential because of the large size and complex shape of molded products. Namely, to decorate a molded product using a film-based decorating method, it is necessary that the whole surface from top to bottom be covered in one go even if the molded product is large in size. Similarly, when a complex shape is involved, the multilayer film for decorative molding needs to fit the whole surface by deforming to the shape of every peak and trough.

The protective layer of a multilayer film for decorative molding needs particularly to have scratch resistance and, as part of a multilayer film for decorative molding, mold-conformability during decorative molding, and there are growing calls for those characteristics.

Further, application of a film-based decorating method to automobile and other parts is accompanied by a requirement for high productivity, namely the completion of a molding operation with only a few steps.

As a multilayer film for decorative molding, a moldable film featuring a protective layer that mainly comprises an acrylic resin as described in Japanese Unexamined Patent Publication (Kokai) No. 2004-299223, Official Gazette and Japanese Unexamined Patent Publication (Kokai) No. 2003-212938, Official Gazette, for instance, has been proposed.

A moldable film that mainly comprises urethane resin and is designed to be cured by heat curing alone as described in Japanese Unexamined Patent Publication (Kokai) No. 2010-260942, Official Gazette has also been proposed.

The method described in Japanese Unexamined Patent Publication (Kokai) No. 2004-299223, Official Gazette and Japanese Unexamined Patent Publication (Kokai) No. 2003-212938, Official Gazette has a problem in that its productivity is low because it needs to, after bonding a multilayer film for decorative molding to the decorable object, run an extra step of irradiating it with an energy ray using a UV lamp to cure the protective layer. The method described in Japanese Unexamined Patent Publication (Kokai) No. 2010-260942, Official Gazette also has a problem in that it cannot simultaneously achieve the scratch resistance of the protective layer and its mold-conformability during decorative molding despite both being essential properties.

In light of such limitations, it could be helpful to provide a high-productivity multilayer film for decorative molding that features a protective layer having both good stretchability, as suited for film-based decorative molding, and good scratch resistance.

SUMMARY

We provide the film configurations described in [1] to [19] below.

[1] A multilayer film for decorative molding which has a multilayer structure wherein a protective layer, a color layer and an adhesive layer are arranged in this order, with a molding film inserted between either of the adjoining pairs of layers or placed on the surface of the protective layer located on the opposite side to the color layer, and which is characterized in that its protective layer contains a polyurethane resin (U) formed at least from an active hydrogen component (A) and an organic isocyanate component (B) and having a polycarbonate skeleton with an alicyclic hydrocarbon group and that it satisfies condition (1) and/or condition (2).

Condition (1): the polyurethane resin (U) is a polyurethane resin (U1) having an alkoxysilyl group and/or a silanol group in a molecule.

Condition (2): the protective layer contains a compound (X) having a glycidyl ether group and an alkoxysilyl group and/or a silanol group, and the polyurethane resin (U) is a polyurethane resin (U2) having an amino group or a carboxyl group and/or a salt thereof.

[2] A multilayer film for decorative molding as described in [1] wherein the active hydrogen component (A) contains a polycarbonate polyol (a1) having an alicyclic hydrocarbon group.

[3] A multilayer film for decorative molding as described in [2] wherein the number average molecular weight of the polycarbonate polyol (a1) is 500 to 5,000 and the mass fraction of the alicyclic hydrocarbon group contained in the polycarbonate polyol (a1) is 1 to 30 mass % relative to the combined mass of the active hydrogen component (A) and the organic isocyanate component (B).

[4] A multilayer film for decorative molding as described in any of [1] to [3] wherein the combined mass fraction of the Si atoms attributed to the alkoxysilyl group and/or the silanol group contained in the polyurethane resin (U) and the Si atoms attributed to the alkoxysilyl group and/or the silanol group contained in the compound (X) is 0.05 to 2.0 mass % relative to the combined mass of the active hydrogen component (A) and the organic isocyanate component (B).

[5] A multilayer film for decorative molding as described in any of [1] to [4] wherein the organic isocyanate component (B) comprises an alicyclic polyisocyanate (b1) with a carbon number of 6 to 18 and/or an aliphatic polyisocyanate (b2) with a carbon number of 4 to 22.

[6] A multilayer film for decorative molding as described in any of [1] to [4] wherein the organic isocyanate component (B) comprises isophorone diisocyanate and/or 4,4-dicyclohexyl methane diisocyanate.

[7] A polyurethane resin used in a multilayer film for decorative molding characterized in that it is formed at least from an active hydrogen component (A) and an organic isocyanate component (B) and that it has a polycarbonate skeleton with an alicyclic hydrocarbon group and has an alkoxysilyl group and/or a silanol group.

[8] A polyurethane resin as described in [7] wherein the active hydrogen component (A) contains a polycarbonate polyol (a1) having an alicyclic hydrocarbon group.

[9] A polyurethane resin as described in [8] wherein the number average molecular weight of the polycarbonate polyol (a1) is 500 to 5,000 and the mass fraction of the alicyclic hydrocarbon group contained in the polycarbonate polyol (a1) is 1 to 30 mass % relative to the combined mass of the active hydrogen component (A) and the organic isocyanate component (B).

[10] A polyurethane resin as described in any of [7] to [9] wherein the mass fraction of the Si atoms attributed to the alkoxysilyl group and/or the silanol group contained in a polyurethane resin (U1) is 0.05 to 2.0 mass % relative to the combined mass of the active hydrogen component (A) and the organic isocyanate component (B).

[11] A polyurethane resin as described in any of [7] to [10] wherein the organic isocyanate component (B) comprises an alicyclic polyisocyanate (b1) with a carbon number of 6 to 18 and/or an aliphatic polyisocyanate (b2) with a carbon number of 4 to 22.

[12] A polyurethane resin as described in any of [7] to [10] wherein the organic isocyanate component (B) comprises isophorone diisocyanate and/or 4,4-dicyclohexyl methane diisocyanate.

[13] A polyurethane resin composition which is formed at least from an active hydrogen component (A) and an organic isocyanate component (B), has a polycarbonate skeleton with an alicyclic hydrocarbon group and contains a polyurethane resin (U2) having an amino group, or a carboxyl group and/or a salt thereof, and a compound (X) having a glycidyl ether group, and an alkoxysilyl group and/or a silanol group, and which is characterized in that it is used in a multilayer film for decorative molding.

[14] A polyurethane resin composition as described in [13] wherein the active hydrogen component (A) contains a polycarbonate polyol (a1) having an alicyclic hydrocarbon group.

[15] A polyurethane resin composition as described in [14] wherein the number average molecular weight of the polycarbonate polyol (a1) is 500 to 5,000 and the mass fraction of the alicyclic hydrocarbon group contained in the polycarbonate polyol (a1) is 1 to 30 mass % relative to the combined mass of the active hydrogen component (A) and the organic isocyanate component (B).

[16] A polyurethane resin composition as described in any of [13] to [15] wherein the mass fraction of the Si atoms attributed to the alkoxysilyl group and/or the silanol group contained in a compound (X) is 0.05 to 2.0 mass % relative to the combined mass of the active hydrogen component (A) and the organic isocyanate component (B).

[17] A polyurethane resin composition as described in any of [13] to [16] wherein the organic isocyanate component (B) comprises an alicyclic polyisocyanate (b1) with a carbon number of 6 to 18 and/or an aliphatic polyisocyanate (b2) with a carbon number of 4 to 22.

[18] A polyurethane resin composition as described in any of [13] to [16] wherein the organic isocyanate component (B) comprises isophorone diisocyanate and/or 4,4-dicyclohexyl methane diisocyanate.

[19] A method of producing a decorative molded body obtained by bonding a multilayer film for decorative molding onto a decorable object which is characterized in that the multilayer film for decorative molding has a multilayer structure wherein a protective layer, a color layer and an adhesive layer are arranged in this order, with a molding film inserted between either of the adjoining pairs of layers or placed on the surface of the protective layer located on the opposite side to the color layer, that the protective layer of the multilayer film for decorative molding contains a polyurethane resin (U) formed at least from an active hydrogen component (A) and an organic isocyanate component (B) and having a polycarbonate skeleton with an alicyclic hydrocarbon group, and that the multilayer film for decorative molding satisfies condition (1) and/or condition (2).

Condition (1): the polyurethane resin (U) has an alkoxysilyl group and/or a silanol group in a molecule.

Condition (2): the protective layer contains a compound (X) having a glycidyl ether group and an alkoxysilyl group and/or a silanol group, and the polyurethane resin (U) has a carboxyl group and/or a salt thereof.

Since the multilayer film for decorative molding is excellent in mold-conformability during decorative molding and, in addition, only needs the heat generated during the molding process to have the curing of the protective layer sufficiently progress and be completed, its use makes it possible to obtain a decorative molded body having high productivity, as well as good mold-conformability during decorative molding and durability (e.g. scratch resistance, weather resistance, chemical resistance and water resistance).

EXPLANATION OF NUMERICAL SYMBOLS

Figure 1:
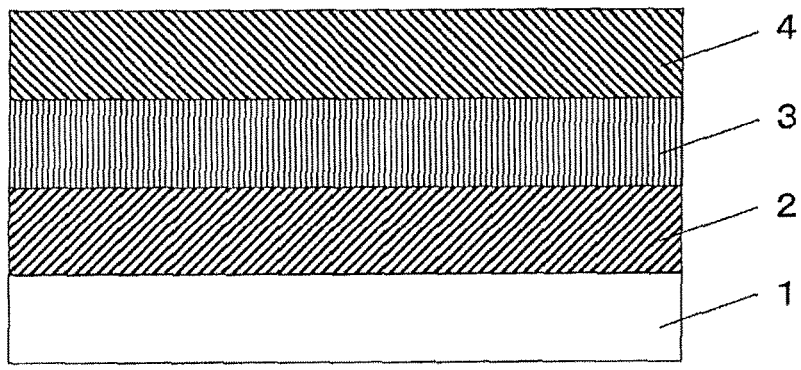
FIG. 1 is a schematic cross-sectional drawing illustrating a multilayer film for decorative molding relating to an example.

1 Molding film
2 Protective layer
3 Color layer
4 Adhesive layer

DETAILED DESCRIPTION

A multilayer film for decorative molding which has a multilayer structure wherein a protective layer, a color layer and an adhesive layer are arranged in this order, with a molding film inserted between either of the adjoining pairs of layers or placed on the surface of the protective layer located on the opposite side to the color layer, whose protective layer contains a polyurethane resin (U) formed at least from an active hydrogen component (A) and an organic isocyanate component (B) and having a polycarbonate skeleton with an alicyclic hydrocarbon group, and which satisfies condition (1) (the polyurethane resin (U) is a polyurethane resin (U1) having an alkoxysilyl group and/or a silanol group in a molecule) and/or condition (2) (the protective layer contains a compound (X) having a glycidyl ether group and an alkoxysilyl group and/or a silanol group, and the polyurethane resin (U) is a polyurethane resin (U2) having an amino group or a carboxyl group and/or a salt thereof) is suitable for providing a decorable object with a surface decoration by placing its adhesive layer closely over the surface of the decorable object and bonding them by thermoforming. The sequential order of the color layer and adhesive layer can be any of the options (i) to (iii) listed below. In this regard, the list shows the decorable object in brackets to clearly illustrate the configurational aspects of the examples despite the fact that it is not included in the multilayer film for a decorative molding.

(i) Molding film/protective layer/color layer/adhesive layer (/decorable object)

(ii) Protective layer/molding film/color layer/adhesive layer (/decorable object)

(iii) Protective layer/color layer/molding film/adhesive layer (/decorable object)

If configurational option (i) is adopted, it is necessary to remove the molding film because of the need to expose the protective layer as the outermost face after decorative molding. Hereinafter, the composite layer comprising the layers from the protective layer to the adhesive layer in any of patterns (a) to (c) below to be formed over the decorable object may be referred to as "decorative layer".

(a) A composite layer (protective layer/color layer/adhesive layer) when adopting configuration (i) with the molding film removed (b) A composite layer (protective layer/molding film/color layer/adhesive layer) when adopting configuration (ii)

(c) A composite layer (protective layer/color layer/molding film/adhesive layer) when adopting configuration (iii)

Decorating a decorable object using such a multilayer film for decorative molding makes it possible to reduce the number of steps forming a decorative layer compared to a decorating method based on conventional spray-coating, which involves multi-stage steps, thus improving the production efficiency of molded products having a decorative layer. This, in turn, makes it possible to lower the cost.

Since such a multilayer film for decorative molding features a protective layer that satisfies condition (1) and/or condition (2) as specified above, the heat generated during the molding process alone is enough to have the curing of its protective layer proceed, and this increases productivity by eliminating the need for a separate energy ray irradiation step. It also exhibits good scratch resistance and good mold-conformability during decorative molding. The use of such a multilayer film for decorative molding, therefore, makes it possible to obtain a decorative molded body with good external appearance.

Molding Film

There are no specific limitations on the kind of film used as a molding film, as long as it has a rupture elongation of 150% or more at 100° C. and is obtained by processing a thermoplastic resin, such as polyolefin, polyester, polyvinyl chloride, poly(meta-)acrylate, polyamide, polyester amide, polyether, polystyrene, polyether ester and polycarbonate. It does not matter whether it is an unstretched film, uniaxially stretched film or biaxially stretched film.

It is preferable that the molding film of a multilayer film for decorative molding not become detached from the adjoining layers during handling or decorative molding.

When the multilayer film for decorative molding takes configuration (i) above, it is necessary that, in addition to preventing the molding film from being detached from the protective layer at the interface between them during handling or decorative molding as described above, the molding film be peeled and removed after decorative molding is completed. In this case, therefore, it is preferable that, in addition to maintaining contact with the protective layer before and during decorative molding, the protective layer-side surface of the molding film be releasable from the protective layer after decorative molding. Although these are mutually exclusive characteristics, it is possible to adjust them appropriately by combining a contact relaxing method and a contact tightening method as described below. Examples of a contact relaxing method include the use of a composite film produced by applying a layer made of a material with low affinity for the protective layer, such as polyolefin, to one side of the molding film (protective layer-side surface) by coextrusion or laminating and coating of the molding film with a mold releasing agent to obtain a composite film. Examples of a contact tightening method include the provision of a corona treatment on one side of the molding film (protective layer-side surface).

When the multilayer film for decorative molding takes configuration (ii) or (iii) above, the molding film is embedded in the decorative layer so that there is no need for its two surfaces to have releasability with respect to the adjoining layers, with the only requirement being close contact. It therefore suffices to provide an adequate level of contact using a method such as the surface coating of the molding film with an adhesive to turn it into a composite film or a surface modification of the molding film through corona treatment or the like.

It is preferable that the thickness of the molding film be 50 to 500 μm, more preferably 75 to 200 μm, in consideration of, among other things, the post-molding rupture strength and shape retainability of the decorative layer. During the production process of the multilayer film for decorative molding, this thickness may be determined by measuring each layer using a micrometer and performing a calculation upon completion of its forming in accordance with JIS C 2151:2006 If the molding film is already laminated with a decorative layer, its thickness can be measured by observing the cross section using a differential interference microscope, laser microscope, electron microscope, or the like.

Protective Layer

When applied to a decorative molded body, the protective layer of a multilayer film for decorative molding constitutes the outermost layer. It is therefore preferable that, in addition to being a resin that leaves intact the mold-conformability during decorative molding of the multilayer film for decorative molding, it be provided with transparency, glossiness and other esthetic design characteristics, as well as abrasion resistance, impact resistance, water resistance, chemical resistance, weather resistance and other coat characteristics. With layers located on the nearer side to the decorable object than the protective layer when a multilayer film for decorative molding becomes part of a decorative molded body, i.e. the color layer, adhesive layer and molding film (only when configuration (ii) or (iii) is used for the multilayer film for decorative molding), mold-conformability during decorative molding is generally given priority, with scratch resistance paid no attention. If, therefore, the protective layer has inferior scratch resistance, the entire decorative layer becomes eroded, thus exposing the decorable object, and this makes it important that the protective layer have scratch resistance. As a protective layer with such characteristics, a protective layer that contains a polyurethane resin (U) formed at least from an active hydrogen component (A) and an organic isocyanate component (B) and having a polycarbonate skeleton with an alicyclic hydrocarbon group may be used. A polyurethane resin having a polycarbonate skeleton with an alicyclic hydrocarbon group provides high crystallinity and helps obtain scratch resistance and esthetic design characteristics, as well as making it possible to secure mold-conformability during decorative molding.

It is preferable that such a polyurethane resin (U) be a polyurethane resin formed from an active hydrogen component (A) that contains a polycarbonate polyol (a1) having an alicyclic hydrocarbon group with preferably a 4 to 10-membered ring (particularly a 6-membered ring) and an organic isocyanate component (B).

Examples of a polycarbonate polyol (a1) having an alicyclic hydrocarbon group include a polycarbonate polyol produced by having alicyclic multivalent (di- to trivalent or above) alcohols with a carbon number of 6 to 20 or a mixture of these and one or more acyclic multivalent (di- to trivalent or above) alcohols with a carbon number of 2 to 20 (preferably alkylene diols having an alkylene group with a carbon number of 6 to 10, more preferably 6 to 9) undergo a dealcoholization condensation reaction with a low molecule carbonate compound (e.g. a dialkyl carbonate having an alkyl group with a carbon number of 1 to 6, an alkylene carbonate having an alkylene group with a carbon number of 2 to 6, or a diaryl carbonate having an aryl group with a carbon number of 6 to 9). Hereinafter, a compound name accompanied by an alphanumerical symbol, such as "a polycarbonate polyol (a1) having an alicyclic hydrocarbon group", may just be denoted by alphanumerical symbol, such as "(a1)".

Examples of an alicyclic multivalent (di- to trivalent or above) alcohol with a carbon number of 6 to 20 include 1,2-cyclobutanediol, 2,2,4,4,-tetramethyl-1,3-cyclobutanediol, 1,2- or 1,3-cyclopentanediol, 3-methyl-1,2-cyclopentanediol, 1,2-, 1,3- or 1,4-cyclohexanediol, 4-methyl-1,2-cyclohexanediol, 1,2-, 1,3- or 1,4-cyclohexanedimethanol, 1,1'-bicyclohexane-1,1'-diol, 1,1'-bicyclohexane-2,2'-diol, 1,1'-bicyclohexane-4,4'-diol, a hydrogenated bisphenol A, hydrogenated bisphenol F, 1,2- or 1,3-cycloheptanediol, 1,2-, 1,4- or 1,5-cyclooctanediol and the like. Of these, 1,4-cyclohexanediol and cyclohexanedimethanol, more preferably 1,4-cyclohexanedimethanol, are preferred from the viewpoint of the scratch resistance and mold-conformability of the protective layer obtained.

Examples of an acyclic multivalent (di- to trivalent or above) alcohol with a carbon number of 2 to 20 include ethylene glycol, 1,2- or 1,3-propylene glycol, diethylene glycol, triethylene glycol, dipropylene glycol, 1,2-, 1,3-, 2,3- or 1,4-butanediol, 3-methyl-1,2-butanediol, 1,2-, 1,4-, 1,5- or 2,4-pentanediol, 2- or 3-methyl-1,5-pentanediol, 2- or 3-methyl-4,5-pentanediol, 2,3-dimethyl trimethylene glycol, 2,2,4-trimethyl-1,3-pentanediol, 1,4-, 1,5-, 1,6- or 2,5-hexanediol, 1,7-heptanediol, 2- or 3-methyl-1,6-hexanediol, 2-, 3- or 4-methyl-1,7-heptanediol, 1,8-octanediol, 2-, 3- or 4-methyl-1,8-octanediol, 1,9-nonanediol, 1,12-dodecanediol, neopenthylene glycol, glycerin, trimethylol ethane, trimethylolpropane, a trialkanol amine with a carbon number of 6 to 12, 1,2,6-hexanetriol, pentaerythritol, diglycerin, triglycerin, dipenta erythritol, sorbitol, mannitol and the like. Of these, a linear diol with a carbon number of 3 to 6 (1,3-propylene glycol, 1,4-butanediol, 1,5-pentanediol, and 1,6-hexanediol) is preferred from the viewpoint of the scratch resistance and mold-conformability of the protective layer obtained.

Of all polycarbonate polyols (a1) having an alicyclic hydrocarbon group, a polycarbonate diol using alicyclic multivalent (di- to trivalent or above) alcohols with a carbon number of 6 to 20 and divalent alcohols as acyclic multivalent (di- to trivalent or above) alcohols with a carbon number of 2 to 20 to be used as needed, as specified above, are preferred from the viewpoint of mold-conformability.

The range of the number average molecular weight (hereinafter abbreviated as "Mn") of a polycarbonate polyol (a1) having an alicyclic hydrocarbon group is preferably 500 to 5,000, more preferably 600 to 3,000, particularly 750 to 2,000, from the viewpoint of the mold-conformability of the protective layer obtained.

Mn may be measured using gel permeation chromatography, for instance, under the following conditions.

Equipment: "HLC-8120GPC" [manufactured by Tosoh Corporation]
Column: "Guard column $H_{XL}$-H" (one piece) and "TSK gel $GMH_{XL}$" (two pieces) [both manufactured by Tosoh Corporation]
Sample solution: 0.25 wt % of tetrahydrofuran solution
Solution injection rate: 100 μl
Flow rate: 1 ml/min
Temperature during measurement: 40° C.
Detection device: Refractive index detector
Standard substance: Standard polystyrene It is preferable that the content of the alicyclic hydrocarbon group attributed to a polycarbonate polyol (a1) having an alicyclic hydrocarbon group in the polyurethane resin (U) be 1 to 30 mass %, more preferably 5 to 25 mass %, particularly 10 to 20 mass %, relative to the combined mass of the active hydrogen component (A) and the organic isocyanate component (B) from the viewpoint of the scratch resistance and esthetic design characteristics of the protective layer.

Apart from a polycarbonate polyol (a1) having an alicyclic hydrocarbon group, any other polyols used to conventionally produce polyurethane may be used as part of the active hydrogen component (A). For instance, it is possible to use a polymer polyol (a2) with an Mn of 500 or more other than (a1), a polyol containing a carboxyl group and a salt thereof (a3), a chain extender (a4), and a reaction terminator (a5).

Examples of a polymer polyol (a2) with an Mn of 500 or more other than (a1) include a polymer polyol used to conventionally produce polyurethane, e.g. a polyester polyol (a21) and a polyether polyol (a22).

Examples of a polyester polyol (a21) include an aliphatic polycarbonate polyol not having an alicyclic hydrocarbon group (a211), a dehydration condensation-type polyester polyol (a212), a polylactone polyol (a213) and the like.

Examples of an aliphatic polycarbonate polyol not having an alicyclic hydrocarbon group (a211) include a polycarbonate polyol produced by having one or a mixture of two or more acyclic multivalent (di- to trivalent or above) alcohols with a carbon number of 2 to 20 as specified above undergo a dealcoholization condensation reaction with a low molecule carbonate compound (e.g. a dialkyl carbonate having an alkyl group with a carbon number of 1 to 6, an alkylene carbonate having an alkylene group with a carbon number of 2 to 6, a diaryl carbonate having an aryl group with a carbon number of 6 to 9) and the like.

Specific examples of an aliphatic polycarbonate polyol not having an alicyclic hydrocarbon group (a211) include a polyhexamethylene carbonate diol, polypentamethylene carbonate diol, polytetramethylene carbonate diol poly(tetramethylene/hexamethylene) carbonate diol (e.g. a diol obtained by having 1,4-butanediol and 1,6-hexanediol undergo a dealcoholization condensation reaction with a dialkyl carbonate) and the like.

Examples of a dehydration condensation-type polyester polyol (a212) include a polyester polyol formed from alicyclic multivalent (di- to trivalent or above) alcohols with a carbon number of 6 to 20 as specified above, and/or acyclic multivalent (di- to trivalent or above) alcohols with a carbon number of 2 to 20 as specified above, and a multivalent carboxylic acid with a carbon number of 2 to 10, or an ester-forming derivative thereof.

Examples of a multivalent carboxylic acid with a carbon number of 2 to 10, or an ester-forming derivative thereof, suitable for use forming a dehydration condensation-type polyester polyol (a212) include an aliphatic dicarboxylic acid (e.g. succinic acid, adipic acid, azelaic acid, sebacic acid, fumaric acid and maleic acid), an alicyclic dicarboxylic acid (e.g. dimer acid), an aromatic dicarboxylic acid (e.g. terephthalic acid, isophthalic acid and phthalic acid), a trivalent or higher polycarboxylic acid (e.g. trimellitic acid and pyromellitic acid), an anhydride thereof (e.g. succinic anhydride, maleic anhydride, phthalic anhydride and trimellitic anhydride), an acid halide thereof (e.g. adipic acid dichloride), a low molecular weight alkyl ester thereof (e.g. dimethyl succinate and phthalic acid dimethyl), and a mixture thereof.

Specific examples of a dehydration condensation-type polyester polyol (a212) include polyethylene adipate diol, polybutylene adipate diol, polyhexamethylene adipate diol, polyhexamethylene isophthalate diol, polyneopenthylene adipate diol, polyethylene propylene adipate diol, polyethylene butylene adipate diol, polybutylene hexamethylene adipate diol, polydiethylene adipate diol, poly(polytetramethylene ether) adipate diol, poly(3-methyl-pentylene adipate) diol, polyethylene azelate diol, polyethylene sebacate diol, polybutylene azelate diol, polybutylene sebacate diol, polyneopenthylene terephthalate diol and the like.

Examples of a polylactone polyol (a213) include a lactonic polyadduct of an alicyclic multivalent (di- to trivalent or above) alcohol with a carbon number of 6 to 20 as specified above and/or an acyclic multivalent (di- to trivalent or above) alcohol with a carbon number of 2 to 20 as specified above and the like, with lactones with a carbon number of 4 to 12 (for instance γ-butyrolactone, γ-valerolactone and ε-caprolactone) and the like among those suited to this purpose.

Specific examples of a polylactone polyol (a213) include polycaprolactone diol, polyvalerolactone diol, polycaprolactone triol and the like.

Examples of a polyether polyol (a22) include an aliphatic polyether polyol (a221) and an aromatic polyether polyol (a222).

Examples of an aliphatic polyether polyol (a221) include a polyoxy ethylene polyol [for instance, polyethylene glycol], polyoxy propylene polyol (for instance, polypropylene glycol), polyoxy ethylene/propylene polyol, polyoxy tetramethylene glycol and the like.

Examples of an aromatic polyether polyol (a222) include an ethylene oxide (hereinafter abbreviated as "EO") adduct of bisphenol A (for instance, a 2-mole EO adduct of bisphenol A, a 4-mole EO adduct of bisphenol A, a 6-mole EO adduct of bisphenol A, an 8-mole EO adduct of bisphenol A, a 10-mole EO adduct of bisphenol A, or a 20-mole EO adduct of bisphenol A), and an propylene oxide (hereinafter abbreviated as "PO") adduct of bisphenol A (for instance, a 2-mole PO adduct of bisphenol A, a 3-mole PO adduct of bisphenol A, or a 5-mole PO adduct of bisphenol A), and other bisphenol-skeletoned polyols, as well as an EO or PO adduct of resorcin.

The Mn of (a2) is preferably 500 to 5,000, more preferably 600 to 4,000-particularly 700 to 3,000, from the viewpoint of the scratch resistance and mold-conformability of the protective layer.

Of all (a2) compounds, an aliphatic polycarbonate polyol (a211) not having an alicyclic hydrocarbon group is preferred from the viewpoint of the weather resistance, water resistance, chemical resistance, scratch resistance and mold-conformability of the protective layer, with a polycarbonate polyol produced by having one or a mixture of two or more linear diols with a carbon number of 3 to 6 (1,3-propylene glycol, 1,4-butanediol, 1,5-pentanediol, and 1,6-hexanediol) undergo a dealcoholization condensation reaction with a low molecule carbonate compound as specified above more preferred.

Examples of a polyol containing a carboxyl group and a salt thereof (a3) include a dialkylol alkane acid with a carbon number of 6 to 24 (for instance, 2,2-dimethylol propionic acid (hereinafter abbreviated as "DMPA"), 2,2-dimethylol butane acid, 2,2-dimethylol heptane acid, or 2,2-dimethylol octanoic acid) and the like and a salt thereof. Possible types of such a salt include an ammonium salt and an amine salt (for instance, a salt of a primary amine with a carbon number of 1 to 12 (primary monoamine, e.g. methyl amine, ethyl amine, propyl amine and octyl amine), a salt of secondary monoamine (e.g. dimethyl amine, diethyl amine and dibutylamine) or a salt of tertiary monoamine (e.g. trimethyl amine, triethyl amine, triethanol amine, N-methyl diethanol amine, N,N-dimethyl ethanol amine and some other aliphatic tertiary monoamine)), and two or more of them may also be used in combination.

Such salts are particularly advantageously used when producing a polyurethane resin (U) as a water dispersion as described later, and, of them, those whose constituent basic compound has a boiling point of −40° C. to 150° C. at atmospheric pressure are preferable from the viewpoint of the water resistance and chemical resistance of the protective layer obtained and the stability of the water dispersion of the urethane resin. Specific examples include an ammonium salt, triethyl amine salt, N,N-dimethyl ethanol amine salt and the like.

Examples of a chain extender (a4) include water, an acyclic multivalent (di- to trivalent or above) alcohol with a carbon number of 2 to 20 as specified above, a low-molecular-weight EO and/or PO adducts of such an acyclic polyhydric alcohol (chemical formula weight or Mn being less than 500), a diamine with a carbon number of 2 to 10 (e.g. ethylene diamine, propylene diamine, 1,2-propane diamine, butylene diamine, hexamethylene diamine, 2,2,4- or 2,4,4-trimethyl hexamethylene diamine, isophorone diamine and some other aliphatic or alicyclic diamine; o-, m- or p-phenylene diamine, toluene diamine, m-xylylene diamine, 4,4'-diaminodiphenyl methane and 4,4'-diamino-3,3'-diethyl diphenyl methane and some other aromatic polyamine), a poly (n=2 to 6) alkylene (with a carbon number of 2 to 6) poly (n=3 to 7) amine (e.g. diethylene triamine, triethylene tetramine, tetraethylene pentamine and pentaethylene hexamine), hydrazine, a derivative thereof (e.g. a dibasic acid dihydrazide, such as adipic acid dihydrazide) and the like.

Examples of a reaction terminator (a5) include a monoalcohol with a carbon number of 1 to 8 (e.g. methanol, ethanol, isopropanol, butanol, cellosolve or "Carbitol") and a monoamine with a carbon number of 1 to 10 (e.g. monomethyl amine, monoethyl amine, monobutyl amine, dibutyl amine, monooctyl amine, monoethanol amine and diethanol amine). The active hydrogen component (A) may comprise any one or a combination of two or more of (a1) to (a5) and the like.

As part of the organic isocyanate component (B), any isocyanate compounds used to conventionally produce polyurethane may be used, and these include, among other things, an alicyclic polyisocyanate (b1) with a carbon number of 6 to 18, an aliphatic polyisocyanate (b2) with a carbon number of 4 to 22, an aromatic polyisocyanate with a carbon number of 8 to 26 (b3), an araliphatic polyisocyanate with a carbon number of 10 to 18 (b4), and a modified product of such a polyisocyanate (b5). The organic isocyanate component (B) may comprise any one or a combination of two or more of the above.

Examples of an alicyclic polyisocyanate (b1) with a carbon number of 6 to 18 include isophorone diisocyanate (hereinafter abbreviated as "IPDI"), 4,4-dicyclohexyl methane diisocyanate (hereinafter abbreviated as hydrogenated "MDI"), cyclohexylene diisocyanate, methyl cyclohexylene diisocyanate, bis(2-isocyanato-ethyl)-4-cyclohexene-1,2-dicarboxylate, 2,5- or 2,6-norbornane diisocyanate and the like.

Examples of an aliphatic polyisocyanate (b2) with a carbon number of 4 to 22 include ethylene diisocyanate, tetramethylene diisocyanate, hexamethylene diisocyanate (hereinafter abbreviated as "HDI"), dodeca methylene diisocyanate, 1,6,11-undecane triisocyanate, 2,2,4-trimethyl hexamethylene diisocyanate, lysine diisocyanate, 2,6-diisocyanato-methyl caproate, bis(2-isocyanato-ethyl) fumarate, bis(2-isocyanato-ethyl) carbonate, 2-isocyanato-ethyl-2,6-diisocyanato-hexanoate and the like.

Examples of an aromatic polyisocyanate with a carbon number of 8 to 26 (b3) include 1,3- or 1,4-phenylene diisocyanate, 2,4- or 2,6-tolylene diisocyanate (hereinafter abbreviated as "TDI"), crude TDI, 4,4'- or 2,4'-diphenyl methane diisocyanate (hereinafter abbreviated as "MDI"), crude MDI, polyaryl polyisocyanate, 4,4'-diisocyanato-1-biphenyl, 3,3'-dimethyl-4,4'-diisocyanato-biphenyl, 3,3'-dimethyl-4,4'-diisocyanato-diphenyl methane, 1,5-naphthylene diisocyanate, 4,4',4"-triphenyl methane triisocyanate, m- or p-isocyanato-phenylsulfonyl isocyanate and the like.

Examples of an araliphatic polyisocyanate (b4) with a carbon number of 10 to 18 include m- or p-xylylene diisocyanate α,α,α',α'-tetramethyl xylylene diisocyanate and the like.

Examples of a modified product (b5) of polyisocyanate (b1) to (b4) include a modified product of polyisocyanate containing a urethane group, carbodiimide group, allophanate group, urea group, biuret group, urethodione group, urethoimine group, isocyanurate group, or oxazolidone group (with a normal free isocyanate group content of 8 to 33 mass %, preferably 10 to 30 mass %, particularly 12 to 29 mass %). Specific examples include a modified MDI (e.g. a urethane-modified MDI, carbodiimide-modified MDI, and trihydrocarbyl phosphate-modified MDI), urethane-modified TDI, biuret-modified HDI, isocyanurate-modified HDI, and isocyanurate modified IPDI.

Of all constituent components of the organic isocyanate component (B), an alicyclic polyisocyanate (b1) with a carbon number of 6 to 18 and an aliphatic polyisocyanate (b2) with a carbon number of 4 to 22 are preferred from the viewpoint of the weather resistance of the protective layer obtained, with an alicyclic diisocyanate with a carbon number of 6 to 18 and an aliphatic diisocyanate with a carbon number of 4 to 22 further preferred, particularly IPDI, hydrogenated MDI, HDI and a mixture thereof and more particularly IPDI, a hydrogenated MDI and a mixture thereof. Of these, a hydrogenated MDI is most preferred.

It is preferable that, from the viewpoint of the scratch resistance and mold-conformability of the protective layer obtained, the combined concentration of the urethane groups and urea groups present in the polyurethane resin (U) be 1.0 to 6.0 m mol/g, more preferably 1.5 to 5.0 m mol/g, particularly 2.0 to 4.0 m mol/g, according to the weight of (U).

Suitably adjusting the types and molecular weights of the active hydrogen component (A) and organic polyisocyanate component (B), as well as the moisture content of the reaction system and the like, makes it possible to bring the combined concentration of the urethane groups and urea groups present in the polyurethane resin (U) to the desired range.

It is preferable that, from the viewpoint of the water resistance, chemical resistance and mold-conformability of the protective layer obtained, the Mn of the polyurethane resin (U) be 10,000 to 1,000,000, more preferably 10,000 to 500,000, particularly 10,000 to 200,000, and most preferably 10,000 to 100,000.

It is preferable that, from the viewpoint of the mold-conformability of the protective layer obtained, the melting temperature of the polyurethane resin (U) be 50 to 280° C., more preferably 60 to 200° C., particularly 80 to 160° C.

The melting temperature of the polyurethane resin (U) is the temperature at which the melt mass flow rate becomes 10 g/10 minutes as measured at a load of 2.16 kg under JIS K 7210: 1999 (a test method for melt mass flow rates of plastics—thermoplastic plastics) using a "Melt Indexer Model I" manufactured by Tester Sangyo Co. Ltd. as melt mass flow rate measurement equipment.

It is further necessary that, to improve the water resistance, chemical resistance and scratch resistance of the protective layer obtained without harming mold-conformability during decorative molding, condition (1) and/or condition (2) below be satisfied.

Condition (1): the polyurethane resin (U) is a polyurethane resin (U1) having an alkoxysilyl group and/or a silanol group in each molecule.

Condition (2): the protective layer contains a compound (X) having a glycidyl ether group and an alkoxysilyl group and/or a silanol group, and the polyurethane resin (U) is a polyurethane resin (U2) having an amino group or a carboxyl group and/or a salt thereof.

Examples of a method to produce a polyurethane resin (U) having an alkoxysilyl group and/or a silanol group in each molecule as specified in condition (1) include a method that lets a polyurethane resin (U2) having an amino group, or a carboxyl group and/or a salt thereof, and a compound (X) having a glycidyl ether group, and an alkoxysilyl group and/or a silanol group in the molecule react with each other (1-1) and a method that lets a polyurethane resin having an isocyanate group and a compound (Y) having an amino group, and alkoxysilyl group and/or a silanol group in the molecule react with each other (1-2).

Examples of a compound (X) used in method (1-1) include a glycidoxyalkyl trialkoxysilane with a carbon number of 7 to 20, a glycidoxyalkyl (alkyl) dialkoxysilane with a carbon number of 7 to 20, a glycidoxyalkyl (dialkyl) alkoxysilane with a carbon number of 7 to 20, and a hydrolysate thereof (a compound having a silanol group derived from any of the aforementioned compounds by converting an alkoxy group contained therein to a hydroxyl group). Specific examples include 3-glycidoxy propyl trimethoxysilane, 3-glycidoxy propyl triethoxysilane, 3-glycidoxy propyl methyl dimethoxy silane and 3-glycidoxy propyl methyl diethoxy silane and the like, and a hydrolysate thereof (a compound having a silanol group derived from any of the aforementioned compounds by converting an alkoxy group contained therein to a hydroxyl group). All types of compound (X) may be used singly or in combination of two or more.

Examples of a method to produce an amino group-variety of the polyurethane resin (U2) having an amino group, or a carboxyl group and/or a salt thereof, used in method (1-1) include a method based on the introduction of terminal amine groups using a polyfunctional amine such as a diamine with a carbon number of 2 to 10 or a poly (n=2 to 6) alkylene (with a carbon number of 2 to 6) poly (n=3 to 7) amine and the like, as exemplified as a chain extender (a4) in the description of the production of a polyurethane resin, a method based on the introduction of terminal isocyanate groups by making the molar quantity of isocyanate groups excessive with respect to active hydrogens that react with isocyanate groups (e.g. hydroxyl groups and amino groups) during the reaction between the active hydrogen component (A) and the organic isocyanate component (B), followed by the conversion thereof into terminal amino groups through a reaction with water, and a method based on the introduction of ketimine bonds to resin terminals using a monoamine having ketimine bonds (—C=N—), followed by the conversion of ketimine bonds to terminal amino groups via hydrolysis and the like.

There are no specific limitations on the monoamine having a ketimine bond described above as long as it contains at least one amino group and at least one ketimine bond in a molecule. Examples include a ketimine compound obtained by letting a diamine with a carbon number of 2 to 10 or a poly (n=2 to 6) alkylene (with a carbon number of 2 to 6) poly (n=3 to 7) amine, as exemplified as a chain extender (a4), and a ketone react with each other. It is preferable that from the viewpoint of the easy evaporability of a ketone during the production of amino groups through the hydrolysis of ketimine bonds, the ketone is a ketone having a boiling point of 120° C. or less, such as acetone, diethyl ketone, methyl ethyl ketone, methyl propyl ketone, methyl isopropyl ketone methyl isobutyl ketone and the like.

Examples of a method to obtain a carboxyl group and/or a salt thereof of a polyurethane resin (U2) having an amino group, or a carboxyl group and/or a salt thereof, used in method (1-1) include a method based on the use of a polyol containing a carboxyl group and a salt thereof (a3) as part of the active hydrogen component (A) during production of a urethane resin.

The temperature, duration and other conditions for the reaction between a glycidyl ether group and an amino group, or a carboxyl group and/or a salt thereof, may be on par with those usually applied to these groups.

Examples of a compound (Y) used in method (1-2) include an aminoalkyl trialkoxysilane with a carbon number of 4 to 20, aminoalkyl (alkyl) dialkoxysilane with a carbon number of 4 to 20, aminoalkyl (dialkyl) alkoxysilane with a carbon number of 4 to 20 and a hydrolysate thereof (a compound having a silanol group derived from any of the aforementioned compounds by converting an alkoxy group contained therein to a hydroxyl group). Specific examples include 3-aminopropyl triethoxysilane, 3-aminopropyl trimethoxysilane, N-2-(aminoethyl)-3-aminopropyl triethoxysilane, N-2-(aminoethyl)-3-aminopropyl trimethoxysilane, N-2-(aminoethyl)-3-aminopropyl methyl dimethoxy silane, and a hydrolysate thereof (a compound having a silanol group derived from any of the aforementioned compounds by converting an alkoxy group contained therein to a hydroxyl group). All types of compound (Y) may be used singly or in combination of two or more.

Examples of a method to produce a polyurethane resin having an isocyanate group used in method (1-2) include a method based on the introduction of terminal isocyanate groups by making the molar quantity of isocyanate groups excessive with respect to active hydrogens (e.g. hydroxyl groups and amino groups) that react with isocyanate groups during the reaction between the active hydrogen component (A) and the organic isocyanate component (B).

When the polyurethane resin (U) is a polyurethane resin (U1) having an alkoxysilyl group and/or a silanol group in each molecule, a protective layer excellent in water resistance, chemical resistance and scratch resistance can be obtained as a result of excellent mold-conformability prior to heating or the like as part of decorative molding and the crosslinking of alkoxysilyl groups and/or silanol groups and the resulting formation of a crosslinked structure during heating or the like as part of decorative molding.

A compound (X) used in method (1-1) may be used as a compound (X) having a glycidyl ether group, and an alkoxysilyl group and/or a silanol group, as specified under condition (2). Similarly, a polyurethane resin (U2) having an amino group, or a carboxyl group and/or a salt thereof, used in method (1-1) may be used as a polyurethane resin (U2) having an amino group, or a carboxyl group and/or a salt thereof, as specified under condition (2).

When the polyurethane resin (U2) as specified under condition (2) is the kind that has a carboxyl group and/or a salt thereof it is preferable that the amount of the carboxyl group and a salt thereof in the polyurethane resin is equal to or greater than the number of moles of the glycidyl ether group contained in the compound (X) from the viewpoint of reactivity with the compound (X), while it is also preferable that the amount of the carboxyl group and a salt thereof in the polyurethane resin is suited to make their content in the polyurethane resin 1.3 m mol/g or less after the reaction with the compound (X) from the viewpoint of water resistance and chemical resistance.

The content of the carboxyl group in the polyurethane resin may be calculated from the acid value as measured using the method described in JIS K 0070: 1992 (potentiometric titration method) when the residue obtained by heat-drying 3 to 10 g of the polyurethane resin (U) at 130° C. for 45 minutes is, after rinsing, heat-dried at 130° C. for 45 minutes again and dissolved in dimethyl formamide.

When the apolyurethane resin (U2) as specified under condition (2) is the kind that has an amino group, it is preferable that the amount of the amino group in the polyurethane resin is equal to or greater than the number of moles of the glycidyl ether group contained in the compound (X) from the viewpoint of reactivity with the compound (X), while it is also preferable that the amount of the amino group in the polyurethane resin is suited to make its content in the polyurethane resin (U) 0.35 m mol/g or less after the reaction with the compound (X) from the viewpoint of water resistance and chemical resistance.

Examples of a method to let the protective layer contain a compound (X) to satisfy condition (2) include a method based on the use of a polyurethane resin composition produced by mixing a polyurethane resin (U2) having an amino group, or a carboxyl group and/or a salt thereof, and a compound (X) in advance and a method based on the mixing of a polyurethane resin (U2) and a compound (X) during production of the multilayer film for decorative molding.

The temperature, duration and other conditions for the reaction between a glycidyl ether group and an amino group, or a carboxyl group and/or a salt thereof, may be on par with those usually applied to these groups.

If the protective layer is made to contain a compound (X), a protective layer excellent in water resistance, chemical resistance and scratch resistance can be obtained as a result of excellent mold-conformability prior to heating or the like as part of decorative molding and a reaction between the glycidyl ether group contained in the compound (X) and the amino group, or a carboxyl group and/or a salt thereof, contained in the polyurethane resin (U2), as well as the crosslinking of alkoxysilyl groups and/or silanol groups introduced into the polyurethane resin by the compound (X) and the resulting formation of a crosslinked structure in the process of the above reaction during heating of the like as part of decorative molding.

It is preferable that, from the viewpoint of the water resistance, chemical resistance and scratch resistance, as well as mold-conformability, of the protective layer obtained, the amount of (X) and/or (Y) used is an amount that makes the combined mass fraction of Si atoms attributed to the alkoxysilyl group and/or the silanol group contained in (X) and/or (Y) 0.05 to 2.0 mass %, more preferably 0.1 to 1.5 mass %, particularly 0.2 to 1.0 mass %, relative to the combined mass of (A) and (B).

It is preferable that polyurethane resin (U) is amenable to use as a solvent solution or water dispersion from the viewpoint of coatability during the formation of the multilayer film for decorative molding. As the method to prepare a solvent solution or water dispersion of the polyurethane resin (U), any known technique may be used.

Examples of a solvent solution preparation method include a technique designed to let the ingredients react in a solvent and a technique designed to dissolve a polyurethane resin (U) in a solvent after having it undergo a reaction under solventless conditions.

Examples of a solvent include a generally known organic solvent, such as a solvent based on a ketone with a carbon number of 3 to 10 (e.g. acetone, methyl ethyl ketone, and methyl isobutyl ketone), a solvent based on an ester with a carbon number of 2 to 10 (e.g. ethyl acetate, butyl acetate or γ-butyrolactone), a solvent based on an ether with a carbon number of 4 to 10 (e.g. tetrahydrofuran and diethylene glycol dimethyl ether), a solvent based on an amide with a carbon number of 3 to 10 (e.g. N,N-dimethyl formamide, N,N-dimethyl acetamide, N-methyl-2-pyrolidone, and N-methyl caprolactam), a solvent based on an alcohol with a carbon number of 1 to 8 (e.g. methanol, ethanol, isopropyl alcohol and octanol), and a solvent based on a hydrocarbon with a carbon number of 4 to 10 (e.g. n-butane, cyclohexane, toluene, and xylene).

Of these, it is preferable to use a polar solvent with a boiling point of 100° C. or less such as acetone, methyl ethyl ketone, ethyl acetate, tetrahydrofuran and isopropyl alcohol, from the viewpoint of the solubility of the polyurethane resin (U) and its dryability during the production of a protective layer.

Examples of a preparation method for a water dispersion include a prepolymer mixing method as described in Japanese Unexamined Patent Publication (Kokai) No. 2004-2732, Official Gazette, and a method designed to form a dead polymer of a urethane resin and disperse it in water as described in International Publication WO 2010/122599.

It is preferable that, when obtaining an aqueous dispersion of a polyurethane resin (U), a polyol containing a carboxyl group and a salt thereof (a3) is used as part of the active hydrogen component (A) from the viewpoint of dispersion stability, as well as the water resistance and chemical resistance of the resin.

The content of the carboxyl group and a salt thereof attributed to a polyol containing a carboxyl group and a salt thereof (a3) present in the polyurethane resin (U), when obtaining an aqueous dispersion, is preferably 0.05 to 1.3 m mol/g, more preferably 0.1 to 1.1 m mol/g, particularly 0.15 to 0.90 m mol/g—relative to the combined mass of the active hydrogen component (A) and the organic isocyanate component (B) from the viewpoint of dispersion stability, as well as the water resistance and chemical resistance of the protective layer obtained.

When the polyurethane resin (U) is a polyurethane resin (U1) having an alkoxysilyl group and/or a silanol group in each molecule as described above, when obtaining an aqueous dispersion, use of a polyol containing a carboxyl group and a salt thereof (a3) as part of the active hydrogen component (A) to prepare (U1) makes it possible to introduce a carboxyl group and a salt thereof into (U1).

When the polyurethane resin (U) is a carboxyl group and a salt thereof-variety of a polyurethane resin (U2) having an amino group or a carboxyl group and/or a salt thereof, when obtaining an aqueous dispersion, the carboxyl group and a salt thereof introduced to confer dispersion stability on this polyurethane resin also contributes to the reaction with a compound (X) having a glycidyl ether group and an alkoxysilyl group and/or a silanol group, as described above.

Examples of a method forming a protective layer using a polyurethane resin (U) include the following:

A solvent solution of a polyurethane resin (U) or a water dispersion of a polyurethane resin (U) can be used to form a polycarbonate-based polyurethane layer by thinly and uniformly coating a molding film with it using a generally known coating method (e.g. bar coating, roll coating, gravure coating, curtain coating, spray coating and silk screen printing) and having it undergo a reaction inside a hot air oven.

A protective layer formed from a polyurethane resin (U) in this manner may contain resins other than a polyurethane resin (U), including, for instance, an acrylic-based polyurethane, polyether-based polyurethane, and polyester-based polyurethane.

A protective layer may also contain a curing accelerator, binding agent, surface adjustor, pigment, dye, plasticizer, ultraviolet absorber, photostabilizer, and the like, as needed. It is preferable that the total content of resins other than a polycarbonate-based polyurethane resin and additives in the protective layer is 15 mass % or less, more preferably 10 mass % or less, relative to the total mass of the polyurethane resin (U) as reference. If resins other than a polycarbonate-based polyurethane resin are contained by a greater amount than the above range, there is a risk that the requisite performance of a protective layer may not be obtained.

The thickness of the protective layer is preferably 10 to 70 μm, more preferably, 20 to 50 μm. If the thickness is 10 μm or more as preferred, it is easier to confer coat characteristics. If the thickness is 70 μm or less as preferred, it is easier to form a color layer over it as this is a moderate thickness consistent with a flat surface. During the production process of the multilayer film for decorative molding, this thickness may be determined by measuring each layer using a micrometer and performing a calculation upon completion of its forming in accordance with JIS C 2151:2006. If the molding film is already laminated with a decorative layer, its thickness can be measured by observing the cross section using a differential interference microscope, laser microscope, electron microscope, or the like.

Color Layer

There are no specific limitations on the color layer used for a multilayer film for decorative molding as long as it is capable of conferring an intended color, texture and the like on the decorable object to be decorated and having concealability upon being molded as part of the decorative molded body. It may, for instance, be a colored resin layer, prepared by mixing a binder resin with a pigment and dye, or a thin metal film layer. A colored resin layer prepared by mixing a binder resin and pigment is more preferable from the viewpoint of ease of color adjustment and good mold-conformability during decorative molding.

The binder resin to be used for a colored resin layer may be a thermosetting resin, thermoplastic resin or light curing resin. Examples of a thermosetting resin include an unsaturated polyester resin, phenol resin, epoxy resin, acrylic resin, urethane resin, melamine resin, urea resin and polycarbonate resin. Examples of a thermoplastic resin include a polyethylene resin, polypropylene resin, polycarbonate resin, acrylic resin and polystyrol resin. Examples of a light curing resin include a urethane acrylate resin, polyester acrylate resin, unsaturated polyester resin, silicone acrylate resin and epoxy acrylate resin. It is possible to use one or more of the above blended with a photopolymerization initiator and the like as needed. Needless to say, these resins may also be blended with a curing agent, curing accelerator, binding agent, surface adjustor, plasticizer, ultraviolet absorber, photostabilizer and other additives, as needed. Though such a resin may be a copolymer or a mixture of different kinds of resins, a thermosetting resin may be advantageously used as it is easy to handle and cheap with good heat resistance. From the viewpoint of mold-conformability during decorative molding, it is particularly desirable to use a resin mixture containing a urethane resin and acrylic resin as a binder resin.

Both inorganic and organic pigments can be used. Examples include aluminum powder, carbon black, titanium dioxide, mica, phthalocyanine green and dioxazine violet. Such pigments may be used singly or as a mixture of two or more. The concentration of a pigment may be adjusted within a range that does not impair the desired effect.

The thickness of the color layer is preferably 15 to 50 μm and more preferably 20 to 40 μm. If the thickness is 15 μm or more as preferred, it is easier to obtain a color layer with an intended color tone. If the thickness is 50 μm or less as preferred, it is easier to form an adhesive layer over it as this is a moderate thickness consistent with a flat surface. During the production process of the multilayer film for decorative molding, this thickness may be determined by measuring each layer using a micrometer and performing a calculation upon completion of its forming in accordance with JIS C 2151:2006. If the molding film is already laminated with a decorative layer, its thickness can be measured by observing the cross section using a differential interference microscope, laser microscope, electron microscope, or the like.

Adhesive Layer

On top of a molding film and a color layer, a multilayer film for decorative molding also features an adhesive layer. The presence of an adhesive layer makes it possible to stretch the multilayer film for decorative molding during the molding process, while, at the same time, providing bonding to the decorable object. There are no specific limitations on the adhesive layer as long as it is adhesive to the decorable object. Examples of an adhesive include an acrylic adhesive, urethane-based adhesive, polyester-based adhesive and olefin-based adhesive. The thickness of the adhesive layer is preferably 5 to 50 μm and more preferably 10 to 40 μm. If the thickness is 5 μm or more as preferred, it is easier to provide bonding to the decorable object. If the thickness is 50 μm or less as preferred, a good appearance can be obtained as this is a moderate thickness consistent with a flat surface. Usually, this thickness can be measured using a micrometer in accordance with JIS C 2151: 2006. If the decorative layer is already laminated with the molding film, it is possible to measure the thickness of the adhesive layer by observing the cross section using a differential interference microscope, laser microscope, electron microscope, or the like.

Preparation Method for Decorative Molded Body

There are no specific limitations on the preparation method for a decorative molded body as long as it is a generally known thermoforming method capable of decorating a decorable object with a three-dimensional shape, including, among other things, vacuum molding and air-pressure forming. However, it is preferable that, from the viewpoint of mold-conformability during decorative molding and adhesiveness to the decorable object, a thermoforming method is designed to bond the multilayer film for decorative molding onto the decorable object by heating it to a temperature equal to or greater than the softening point of the constituent layer of the decorative layer with the highest softening point under reduced pressure conditions and bringing its adhesive layer into contact with the surface of the decorable object.

EXAMPLES

Our resins, films and methods will now be illustrated in greater detail with reference to examples below. However, it should be understood that this disclosure is not construed as being limited thereto. Hereinafter, the term "parts" refers to parts by mass.

Working Example 1

In a simple pressure reaction apparatus equipped with a stirrer and heater, 165.5 parts of a polycarbonate diol with an Mn of 1,000 resulting from a reaction between 1,4-cyclohexanedimethanol and an ethylene carbonate as (a1), 66.2 parts of a polycarbonate diol with an Mn of 2,000 resulting from a reaction between a mixture of 1,4-butanediol and 1,6-hexanediol (molar ratio 70:30) and an ethylene carbonate as (a2), 21.3 parts of DMPA as (a3), 0.26 parts of ethylene glycol as (a4), 104.4 parts of IPDI as the organic polyisocyanate component (B) and 153.3 parts of acetone as a reaction solvent were placed and stirred at 85° C. for 15 hours, leading to a urethanation reaction, with an acetone solution of a urethane prepolymer having terminal isocyanate groups obtained as a result. After this, while providing stirring at 40° C., 12.9 parts of triethyl amine as a neutralization agent and 623.9 parts of water were added. After providing stirring at 60 rpm for 3 minutes, 1.5 parts of 3-aminopropyl trimethoxysilane as a compound (Y) and 3.6 parts of ethylene diamine as (a4) were added, and acetone was removed by evaporation under reduced pressure conditions at 65° C. over 8 hours, with 1,000 parts of a water dispersion of a polyurethane resin (U1-1) having a silanol group in each molecule obtained as a result.

Next, the preparation method for a multilayer film for decorative molding is described. As a molding film 1, a dry laminate of a 100 μm-thick unstretched polyethylene terephthalate film (manufactured by Toray Industries, Inc., FL10), coated with a urethane-based adhesive (TR-7233, manufactured by Shin-Nakamura Chemical Co., Ltd.) to a post-drying thickness of 0.5 μm using a bar coater, and a 40 μm-thick unstretched polypropylene film (manufactured by Mitsui Chemicals Tohcello Inc., SC) was used. The molding film was coated with a water dispersion of a polyurethane resin (U1-1) as described above to a thickness equivalent to a post-drying thickness of 40 μm on the unstretched polypropylene film side using an applicator and then dried at 80° C. for 10 minutes, with a protective layer 2 formed in the process. Next, the protective layer 2 formed on the molding film 1 was coated with a paint (manufactured by Nippon Bee Chemical, R2325) for forming a color layer 3 to a thickness equivalent to a post-drying thickness of 40 μm using an applicator and then dried at 80° C. for 10 minutes, with a color layer 3 formed in the process. After this, the color layer 3 formed on the protective layer 2, itself formed on the molding film 1, was coated with a paint (manufactured by Toyobo Co., Ltd., M-28) for forming an adhesive layer 4 to a thickness equivalent to a post-drying thickness of 20 μm using an applicator and then dried at 80° C. for 10 minutes, with an adhesive layer 4 formed in the process. In this manner, a multilayer film for decorative molding as illustrated in FIG. 1 was obtained.

Working Example 2

Figure 2:
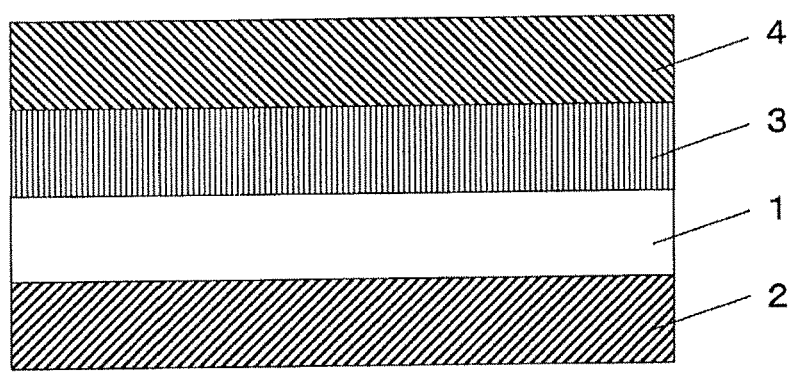
FIG. 2 is a schematic cross-sectional drawing illustrating a multilayer film for decorative molding relating to another example.

A protective layer 2 was formed on the molding film 1 using the same method as working example 1, except that a 100 μm-thick unstretched polyethylene terephthalate film (manufactured by Toray Industries, Inc., FL10) was just used as the molding film 1. A color layer 3 was then formed using the same method as working example 1, except that the color layer 3 was formed on the side of the molding film 1 opposite to the protective layer 2. Next, an adhesive layer 4 was formed on the color layer 3 using the same method as working example 1. In this manner, a multilayer film for decorative molding as illustrated in FIG. 2 was obtained.

Working Example 3

Figure 3:
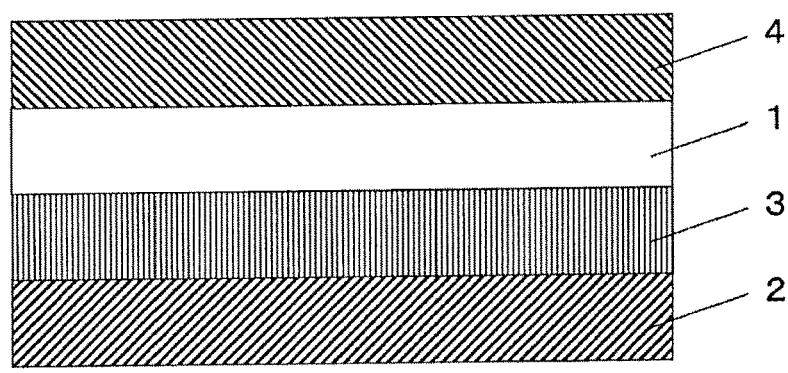
FIG. 3 is a schematic cross-sectional drawing illustrating a multilayer film for decorative molding relating to yet another example.

First, a color layer 3 was formed on the molding film 1 using the same molding film 1 as working example 2 and under the same color layer coating conditions as working example 2. A protective layer 2 was then formed on the color layer 3, itself formed on the molding film 1, under the same coating conditions as working example 1. Next, an adhesive layer 4 was formed using the same method as working example 1, except that the adhesive layer 4 was formed on the molding film 1 on the side opposite to the protective layer 2, which had been formed on the color layer 3, itself formed on the molding film 1. In this manner, a multilayer film for decorative molding as illustrated in FIG. 3 was obtained.

Working Example 4

A water dispersion of a polyurethane resin (U1-2) having a silanol group in each molecule was obtained in the same manner as working example 1, except that the types and amounts used of the input materials were changed to those specified in Table 1. A multilayer film for decorative molding was then obtained using the same method as working example 1, except that the polyurethane resin (U1-2) was used.

Working Example 5

In a simple pressure reaction apparatus equipped with a stirrer and heater, 147.7 parts of a polycarbonate diol with an Mn of 900 resulting from a reaction between a mixture of 1,4-cyclohexanedimethanol and 1,6-hexanediol (molar ratio 50:50) and ethylene carbonate as (a1), 65.6 parts of a polycarbonate diol with an Mn of 2,000 resulting from a reaction between a mixture of 1,4-butanediol and 1,6-hexanediol (molar ratio 70:30) and ethylene carbonate as (a2), 21.3 parts of DMPA as (a3), 0.26 parts of ethylene glycol as (a4), 122.8 parts of hydrogenated MDI as the organic polyisocyanate component (B) and 153.3 parts of acetone as a reaction solvent were placed and stirred at 85° C. for 15 hours, leading to a urethanation reaction, with an acetone solution of a urethane prepolymer having terminal isocyanate groups obtained as a result. 511 parts of the acetone solution of the resulting urethane prepolymer was fed to the simple pressure reaction apparatus, and, while providing stirring at 40° C., 12.9 parts of triethyl amine as a neutralization agent and 623.9 parts of water were added. After providing stirring at 60 rpm for 3 minutes, 3.6 parts of ethylene diamine as (a4) was added, and acetone was removed by evaporation under reduced pressure conditions at 65° C. over 8 hours, followed by the addition at 30° C. of 15.3 parts of 3-glycidoxy propyl trimethoxysilane as a compound (X) and 10 minutes of stirring, with 1,000 parts of a water dispersion containing a polyurethane resin (U2-1) having a carboxyl group and a salt thereof in each molecule and 3-glycidoxy propyl silane triol obtained as a result. Next, a multilayer film for decorative molding was obtained using the same method as working example 1, except that a water dispersion (U2-1) containing the polyurethane resin and 3-glycidoxy propyl silane triol was used.

Working Example 6

Under nitrogen atmosphere, 13.1 parts of a polycarbonate diol with an Mn of 900 resulting from a reaction between a mixture of 1,4-cyclohexanedimethanol and 1,6-hexanediol (molar ratio 50:50) and ethylene carbonate as (a1), 116.8 parts of a polycarbonate diol with an Mn of 1,000 resulting from a reaction between a mixture of 1,4-butanediol and 1,6-hexanediol (molar ratio 70:30) and ethylene carbonate as (a2), 34.4 parts of DMPA as (a3), 5.1 parts of ethylene glycol as (a4) and 119.6 parts of hydrogenated MDI as (B) were placed in a KRC kneader [manufactured by Kurimoto, Ltd.], a biaxial kneading machine, and kneaded at 220° C. for 10 minutes, leading to a urethanation reaction. The reaction product was taken out and, after being squeezed flat using a compression press heated to 180° C., cut using an angular pelletizer [manufactured by Horai Co., Ltd.], with a polyurethane resin obtained as a result. Next, 289 parts of the obtained polyurethane resin, 14 parts of 25 mass % aqueous ammonia as a neutralization agent and 660.5 parts of water were placed in a temperature-controllable pressure-resistant vessel and subjected to a dispersion treatment at 150° C. and 12,000 rpm for 3 minutes using a Clearmix dispersing machine [manufactured by M Techniqute Co. Ltd.], with a water dispersion of a polyurethane resin obtained. With 36.5 parts of 3-glycidoxy propyl trimethoxysilane as a compound (X) added, 963.5 parts of the obtained water dispersion of a polyurethane resin was then stirred at 30° C. for 10 minutes, with 1,000 parts of a water dispersion containing a polyurethane resin (U2-2) having a carboxyl group and a salt thereof in each molecule and 3-glycidoxy propyl silane triol obtained. Next, a multilayer film for decorative molding was obtained using the same method as working example 1, except that a water dispersion containing a polyurethane resin (U2-2) having a carboxyl group and a salt thereof in each molecule and 3-glycidoxy propyl silane triol was used.

Working Examples 7 to 9

A water dispersion containing one of the polyurethane resins (U2-3) to (U2-5) having a carboxyl group and a salt thereof in each molecule and 3-glycidoxy propyl silane triol was obtained in the same manner as working example 4, except that the types and amounts used of the input materials were changed to those specified in Table 1. A multilayer film for decorative molding was then obtained using the same method as working example 1, except that a water dispersion containing one of the polyurethane resins (U2-3) to (U2-5) having a carboxyl group and a salt thereof in each molecule and 3-glycidoxy propyl silane triol was used.

Comparative Example 1

A water dispersion containing a polyurethane resin (U2'-1) having a carboxyl group and a salt thereof in each molecule and 3-glycidoxy propyl silane triol was obtained in the same manner as working example 6, except that the types and amounts used of the input materials were changed to those specified in Table 1. A multilayer film for decorative molding was then obtained using the same method as working example 1, except that a water dispersion containing a polyurethane resin (U2'-1) having a carboxyl group and a salt thereof in each molecule and 3-glycidoxy propyl silane triol was used.

Comparative Example 2

A water dispersion of a polyurethane resin (U2'-2) having a carboxyl group and a salt thereof in each molecule was obtained in the same manner as working example 6, except that the types and amounts used of the input materials were changed to those specified in Table 1 and that a compound (X) was not added. A multilayer film for decorative molding was then obtained using the same method as working example 1, except that a water dispersion of the polyurethane resin (U2'-2) was used.

TABLE 1

| | | | Working example 1 | Working example 2 | Working example 3 | Working example 4 | Working example 5 | Working example 6 |
|---|---|---|---|---|---|---|---|---|
| | | Type of polyurethane resin (U) | U1-1 | U1-1 | U1-1 | U1-2 | U2-1 | U2-2 |
| Active hydrogen component (A) | (a1) | A polycarbonate diol with an Mn of 1,000 resulting from a reaction between 1,4-cyclohexanedimethanol and an ethylene carbonate | parts by mass | 165.5 | 165.5 | 165.5 | — | — | — |
| | | A polycarbonate diol with an Mn of 900 resulting from a reaction between a mixture of 1,4-cyclohexanedimethanol and 1,6-hexanediol (molar ratio 50:50) and ethylene carbonate | parts by mass | — | — | — | 152.7 | 147.7 | 13.1 |
| | (a2) | A polycarbonate diol with an Mn of 2,000 resulting from a reaction between a mixture of 1,4-butanediol and 1,6-hexanediol (molar ratio 50:50) and an ethylene carbonate | parts by mass | 66.2 | 66.2 | 66.2 | 67.9 | 65.6 | — |
| | | A poly carbonate diol with an Mn of 2,000 resulting from a reaction between a mixture of 1,3-propanediol and 1,4-butanediol (molar ratio 50:50) and ethylene carbonate | parts by mass | — | — | — | — | — | — |
| | | A polycarbonate diol with an Mn of 1,000 resulting from a reaction between a mixture of 1,4-butanediol and 1,6-hexanediol (molar ratio 70:30) and ethylene carbonate | parts by mass | — | — | — | — | — | 116.8 |
| | (a3) | DMPA | parts by mass | 21.3 | 21.3 | 21.3 | 21.3 | 21.3 | 34.4 |
| | (a4) | Ethylene glycol | parts by mass | 0.26 | 0.26 | 0.26 | 0.26 | 0.26 | 5.1 |
| | | Ethylene diamine | parts by mass | 3.6 | 3.6 | 3.6 | 3.6 | 3.6 | — |
| Organic polyisocyanate component (B) | | IPDI | parts by mass | 104.4 | 104.4 | 104.4 | 53.0 | — | — |
| | | MDI-H | parts by mass | — | — | — | 62.5 | 122.8 | 119.6 |
| | | HDI | parts by mass | 153.3 | 153.3 | 153.3 | 153.3 | 153.3 | — |
| Reaction solvent | | Acetone | parts by mass | 12.9 | 12.9 | 12.9 | 13.0 | 13.0 | — |
| Neutralization agent | | Triethyl amine | parts by mass | — | — | — | — | — | 14.0 |
| | | 25 mass % aqueous ammonia | parts by mass | — | — | — | — | — | — |
| | | Water | parts by mass | 623.9 | 623.9 | 623.9 | 623.9 | 623.9 | 660.5 |
| Compound (X) | | 3-glycidoxy propyl trimethoxysilane | parts by mass | — | — | — | — | 15.3 | 36.5 |
| | | 3-glycidoxy propyl methyl dimethoxy silane | parts by mass | — | — | — | 5.8 | — | — |
| Compound (Y) | | 3-aminopropyl trimethoxysilane | parts by mass | 1.5 | 1.5 | 1.5 | — | — | — |
| Properties | | Mass fraction of the alicyclic hydrocarbon group contained in (a1) relative to combined mass of (A) and (B) | % | 27.4 | 27.4 | 27.4 | 11.0 | 11.0 | 1.3 |
| | | Total content of the carboxyl group and a salt thereof attributed to (a3) present in (U) | mmol/g | 0.45 | 0.45 | 0.45 | 0.45 | 0.45 | 0.89 |
| | | Combined concentration of the urethane groups and urea groups present in (U) | mmol/g | 2.5 | 2.5 | 2.5 | 2.5 | 2.5 | 3.2 |
| | | Mass fraction of Si atoms attributed to the alkoxy silyl group and/or the silanol group relative to combined mass of (A) and (B) | % | 0.07 | 0.07 | 0.07 | 0.25 | 0.5 | 1.5 |

TABLE 1-continued

| Evaluation results | Stretching conditions | Working example 7 | Working example 8 | Working example 9 | Comparative example 1 | Comparative example 2 |
|---|---|---|---|---|---|---|
| Rupture elongation | — | 1000 | 1000 | 900 | 1000 | 1000 |
| Pencil hardness | — | B | B | 2B | B | 2B |
| Water resistance | — | ○ | ○ | ○ | ○ | ○ |
| Chemical resistance | — | ○ | ○ | ○ | ○ | ○ |
| Scratch resistance | A | ○ | ○ | ○ | ○ | ○ |
| Scratch resistance | B | ○ | ○ | ○ | ○ | ○ |

| | | | | Working example 7 | Working example 8 | Working example 9 | Comparative example 1 | Comparative example 2 |
|---|---|---|---|---|---|---|---|---|
| | | Type of polyurethane resin (U) | | U2-3 | U2-4 | U2-5 | U2'-1 | U2'-2 |
| Active hydrogen component (A) | (a1) | A polycarbonate diol with an Mn of 1,000 resulting from a reaction between 1,4-cyclohexanedimethanol and an ethylene carbonate | parts by mass | — | — | 122.3 | — | — |
| | | A polycarbonate diol with an Mn of 900 resulting from a reaction between a mixture of 1,4-cyclohexanedimethanol and 1,6-hexanediol (molar ratio 50:50) and ethylene carbonate | parts by mass | 79.0 | 108.9 | — | — | 90.3 |
| | (a2) | A polycarbonate diol with an Mn of 2,000 resulting from a reaction between a mixture of 1,4-butanediol and 1,6-hexanediol (molar ratio 70:30) and an ethylene carbonate | parts by mass | — | — | — | — | 64.5 |
| | (a3) | A poly carbonate diol with an Mn of 2,000 resulting from a reaction between a mixture of 1,3-propanediol and 1,4-butanediol (molar ratio 50:50) and ethylene carbonate | parts by mass | — | — | — | 135.9 | — |
| | (a4) | A polycarbonate diol with an Mn of 1,000 resulting from a reaction between a mixture of 1,4-butanediol and 1,6-hexanediol (molar ratio 70:30) and ethylene carbonate | parts by mass | 12.1 | 38.9 | 61.2 | 22.7 | 40.2 |
| | | DMPA | parts by mass | 35.3 | 35.1 | 34.9 | 39.7 | 1.00 |
| | | Ethylene glycol | parts by mass | 18.0 | 3.0 | 0.38 | 1.60 | — |
| | | Ethylene diamine | parts by mass | — | — | — | — | — |
| Organic polyisocyanate component (B) | | IPDI | parts by mass | — | — | — | — | — |
| | | MDI-H | parts by mass | 125.3 | 89.6 | — | 79.5 | 85.8 |
| | | HDI | parts by mass | 26.8 | 19.1 | 74.1 | 17.0 | 18.3 |
| Reaction solvent | | Acetone | parts by mass | — | — | — | — | — |
| Neutralization agent | | Triethyl amine | parts by mass | 14.3 | 14.2 | 14.2 | 16.1 | 16.3 |
| | | 25 mass % aqueous ammonia | parts by mass | — | — | — | — | — |
| | | Water | parts by mass | 676.7 | 672.6 | 668.3 | 675.0 | 683.6 |

TABLE 1-continued

|  |  |  |  |  |  |  |
|---|---|---|---|---|---|---|
| Compound (X) | 3-glycidoxy propyl trimethoxysilane | parts by mass | 12.5 | 18.6 | 24.6 | 12.5 | 0 |
|  | 3-glycidoxy propyl methyl dimethoxy silane | parts by mass | — | — | — | — | — |
| Compound (Y) | 3-aminopropyl trimethoxysilane | parts by mass | 7.6 | 10.0 | 25.0 | 0.0 | 8.1 |
| Properties | Mass fraction of the alicyclic hydrocarbon group contained in (a1) relative to combined mass of (A) and (B) | % | 0.89 | 0.89 | 0.89 | 1.00 | 1.00 |
|  | Total content of the carboxyl group and a salt thereof attributed to (a3) present in (U) | mmol/g | 4.5 | 3.1 | 3.0 | 2.7 | 2.9 |
|  | Combined concentration of the urethane groups and urea groups present in (U) | mmol/g | 0.5 | 0.74 | 1.0 | 0.5 | 0.0 |
|  | Mass fraction of Si atoms attributed to the alkoxy silyl group and/or the silanol group mass % relative to combined mass of (A) and (B) |  |  |  |  |  |  |
| Evaluation results | Rupture elongation | Stretching conditions | 600 | 1000 | 1000 | 1200 | 1200 |
|  | Pencil hardness | — | B | 2B | 3B | 4B | 4B |
|  | Water resistance | — | ○ | ○ | ○ | X | X |
|  | Chemical resistance | A | ○ | ○ | ○ | △ | △ |
|  | Scratch resistance | B | ○ | ○ | ○ | X | X |

Working Example 10

In a simple pressure reaction apparatus equipped with a stirrer and heater, 184.7 parts of a polycarbonate diol with an Mn of 900 resulting from a reaction between a mixture of 1,4-cyclohexanedimethanol and 1,6-hexanediol (molar ratio 50:50) and ethylene carbonate as (a1), 68.4 parts of a polycarbonate diol with an Mn of 2,000 resulting from a reaction between 1,6-hexanediol and ethylene carbonate as (a2), 29 parts of DMPA as (a3), 26.9 parts of 1,6-hexanediol as (a4), 178.2 parts of hydrogenated MDI as (B) and 487.3 parts of methyl ethyl ketone as a reaction solvent were placed and stirred at 90° C. for 24 hours, leading to a urethanation reaction, with a methyl ethyl ketone solution of a polyurethane resin obtained as a result. With 25.5 parts of 3-glycidoxy propyl trimethoxysilane added as a compound (X), a 10-minute stirring was provided at 30° C., with 1,000 parts of a methyl ethyl ketone solution containing a polyurethane resin (U2-6) containing a carboxyl group in each molecule and 3-glycidoxy propyl trimethoxysilane obtained as a result. A multilayer film for decorative molding was then obtained using the same method as working example 1, except that a methyl ethyl ketone solution containing a polyurethane resin (U2-6) containing a carboxyl group in each molecule and 3-glycidoxy propyl trimethoxysilane was used.

Working Example 11

A multilayer film for decorative molding was obtained using the same method as working example 2, except that the methyl ethyl ketone solution containing a polyurethane resin (U2-6) containing a carboxyl group in each molecule and 3-glycidoxy propyl trimethoxysilane as obtained in working example 10 was used.

Working Example 12

A multilayer film for decorative molding was obtained using the same method as working example 3, except that the methyl ethyl ketone solution containing a polyurethane resin (U2-6) containing a carboxyl group in each molecule and 3-glycidoxy propyl trimethoxysilane as obtained in working example 10 was used.

Working Examples 13 to 22

A methyl ethyl ketone solution containing one of the polyurethane resins (U2-7) to (U2-16) having a carboxyl group in each molecule and 3-glycidoxy propyl trimethoxysilane or 3-glycidoxy propyl methyl dimethoxy silane was obtained in the same manner as working example 8, except that the types and amounts used of the input materials were changed to those specified in Table 2. A multilayer film for decorative molding was then obtained using the same method as working example 1, except that a methyl ethyl ketone solution containing one of the polyurethane resins (U2-7) to (U2-16) having a carboxyl group in each molecule and 3-glycidoxy propyl trimethoxysilane or 3-glycidoxy propyl methyl dimethoxy silane was used.

Working Example 23

In a simple pressure reaction apparatus equipped with a stirrer and heater, 280.8 parts of a polycarbonate diol with an Mn of 900 resulting from a reaction between a mixture of 1,4-cyclohexanedimethanol and 1,6-hexanediol (molar ratio 50:50) and ethylene carbonate as (a1), 21.5 parts of ethylene glycol as (a4), 26.9 parts of 1,6-hexanediol also as (a4), 138.4 parts of hydrogenated MD as (B), 29.6 parts of HDI also as (B) and 470.5 parts of methyl ethyl ketone as a reaction solvent were placed and stirred at 90° C. for 24 hours, leading to a urethanation reaction, with a methyl ethyl ketone solution of a polyurethane resin having a terminal isocyanate group obtained as a result. Next, 11.2 parts of a monoamine having a ketimine bond resulting from a reaction between diethylene triamine and methyl isobutyl ketone as (a5) was fed and stirred at 60° C. for 30 minutes, and, after feeding 28.2 parts of water, a 10-minute stirring was provided at 60° C., with a polyurethane resin having a terminal amino group obtained as a result. With 19.8 parts of 3-glycidoxy propyl trimethoxysilane added at 30° C., a 10-minute stirring was provided, with a methyl ethyl ketone solution containing a polyurethane resin (U1-3) having a silanol group in each molecule obtained as a result. A multilayer film for decorative molding was then obtained using the same method as working example 1, except that a polyurethane resin (U1-3) having a silanol group in each molecule was used.

Comparative Example 3

A methyl ethyl ketone solution containing a polyurethane resin (U2'-3) having a carboxyl group in each molecule and 3-glycidoxy propyl trimethoxysilane was obtained in the same manner as working example 8, except that the types and amounts used of the input materials were changed to those specified in Table 2. A multilayer film for decorative molding was then obtained using the same method as working example 1, except that a methyl ethyl ketone solution containing a polyurethane resin (U2'-3) having a carboxyl group in each molecule and 3-glycidoxy propyl trimethoxysilane was used.

Comparative Example 4

A methyl ethyl ketone solution containing a polyurethane resin (U2'-4) having a carboxyl group in each molecule was obtained in the same manner as working example 8, except that the types and amounts used of the input materials were changed to those specified in Table 2 and that a compound (X) was not added. A multilayer film for decorative molding was then obtained using the same method as working example 1, except that a polyurethane resin (U2'-4) was used.

Comparative Example 5

In a simple pressure reaction apparatus equipped with a stirrer and heater, 8.0 parts of ethylene glycol as (a4), 238.1 parts of a 3-mole PO adduct of bisphenol A also as (a4), 23.4 parts of DMPA as (a3), 220.3 parts of MDI as (B) and 489.6 parts of methyl ethyl ketone as a reaction solvent were placed and stirred at 80° C. for 12 hours, leading to a urethanation reaction, with a methyl ethyl ketone solution of a polyurethane resin obtained as a result. With 20.6 parts of 3-glycidoxy propyl trimethoxysilane as a compound (X) added at 30° C., a 10-minutes stirring was provided, and 1,000 parts of a methyl ethyl ketone solution containing a polyurethane resin (U2'-5) having a carboxyl group in each molecule and 3-glycidoxy propyl trimethoxysilane was obtained as a result. A multilayer film for decorative molding was then obtained using the same method as working example 1, except that the polyurethane resin (U2'-5) was used.

TABLE 2

| | | | Working example 10 | Working example 11 | Working example 12 | Working example 13 | Working example 14 | Working example 15 | Working example 16 | Working example 17 | Working example 18 |
|---|---|---|---|---|---|---|---|---|---|---|---|
| | | Type of polyurethane resin (U) | U2-6 | U2-6 | U2-6 | U2-7 | U2-8 | U2-9 | U2-10 | U2-11 | U2-12 |
| Active hydrogen component (A) | (a1) | A poly carbonate diol with an Mn of 1,000 resulting from a reaction between 1,4-cyclohexanedimethanol and an ethylene carbonate | parts by mass | — | — | — | — | — | 115.4 | — | — | 83.1 |
| | | A poly carbonate diol with an Mn of 900 resulting from a reaction between a mixture of 1,4-cyclohexanedimethanol and 1,6-hexanediol (molar ratio 50:50) and ethylene carbonate | parts by mass | 184.7 | 184.7 | 184.7 | 185.9 | 198.2 | — | 198.4 | 269.8 | — |
| | (a2) | A poly carbonate diol with an Mn of 2,000 resulting from a reaction between a mixture of 1,4-butanediol and 1,6-hexanediol (molar ratio 70:30) and an ethylene carbonate | parts by mass | — | — | — | — | — | — | — | — | 302.0 |
| | | A poly carbonate diol with an Mn of 2,000 resulting from a reaction between a mixture of 1,3-propanediol and 1,4-butanediol (molar ratio 50:50) and ethylene carbonate | parts by mass | — | — | — | 67.4 | — | — | — | 82.6 | — |
| | | A poly carbonate diol with an Mn of 1,000 resulting from a reaction between a mixture of 1,4-butanediol and 1,6-hexanediol (molar ratio 70:30) and ethylene carbonate | parts by mass | 68.4 | 68.4 | 68.4 | — | 71.9 | — | — | — | — |
| | (a3) | DMPA | parts by mass | 29.0 | 29.0 | 29.0 | 52.5 | 23.4 | 34.0 | 52.5 | 14.6 | 14.6 |
| | (a4) | Ethylene glycol | parts by mass | — | — | — | 2.53 | 14.9 | 44.9 | 20.5 | 3.96 | — |
| | | 1,3-propylene glycol | parts by mass | — | — | — | — | — | — | — | — | — |
| | | 1,6-hexanediol | parts by mass | 26.9 | 26.9 | 26.9 | — | — | — | — | — | — |
| | | 3-mole PO adduct of bisphenol A | parts by mass | — | — | — | — | — | — | — | — | — |
| | (a5) | A monoamine having a ketimine bond resulting from a reaction between diethylene triamine and methyl isobutyl ketone | parts by mass | — | — | — | — | — | — | — | — | — |
| Organic polyisocyanate component (B) | | IPDI | parts by mass | — | — | — | — | — | — | — | 32.8 | — |
| | | MDI-H | parts by mass | 178.2 | 178.2 | 178.2 | 180.9 | 181.0 | 280.7 | 179.9 | 77.5 | 89.1 |
| | | HDI | parts by mass | — | — | — | — | — | — | 38.5 | 8.3 | — |
| | | MDI | parts by mass | — | — | — | — | — | — | — | — | — |
| Reaction solvent | | Methyl ethyl ketone | parts by mass | 487.3 | 487.3 | 487.3 | 490.1 | 490.1 | 475 | 489.7 | 489.7 | 490.6 |
| Compound (X) | | 3-glycidoxy propyl trimethoxy silane | parts by mass | 25.5 | 25.5 | 25.5 | 20.6 | 20.6 | 50.0 | 20.6 | 20.6 | 20.6 |
| | | 3-glycidoxy propyl methyl dimethoxy silane | parts by mass | — | — | — | — | — | — | — | — | — |
| Compound (Y) | | 3-aminopropyl trimethoxy silane | parts by mass | — | — | — | — | — | — | — | — | — |

TABLE 2-continued

| Properties | | | Working example 19 | Working example 20 | Working example 21 | Working example 22 | Working example 23 | Comparative example 3 | Comparative example 4 | Comparative example 5 |
|---|---|---|---|---|---|---|---|---|---|---|
| Mass fraction of the alicyclic hydrocarbon group contained in (a1) relative to combined mass of (A) and (B) | | mass % | 11.2 | 11.2 | 11.2 | 10.2 | 10.9 | 14.5 | 14.8 | 10.1 |
| Total content of the carboxyl group and a salt thereof attributed to (a3) present in (U) | | mmol/g | 0.45 | 0.45 | 0.45 | 0.80 | 0.36 | 0.53 | 0.22 | 0.22 |
| Combined concentration of the urethane groups and urea groups present in (U) | | mmol/g | 2.8 | 2.8 | 2.8 | 2.8 | 2.8 | 4.5 | 2.0 | 1.3 |
| Mass fraction of Si atoms attributed to the alkoxy silyl group and/or the silanol group relative to combined mass of (A) and (B) | | mass % | 0.6 | 0.6 | 0.6 | 0.5 | 0.5 | 1.2 | 0.5 | 0.5 |
| Evaluation results | Rupture elongation | | 800 | 800 | 800 | 950 | 900 | 500 | 900 | 1200 |
| | Stretching conditions | | — | — | — | — | — | — | — | — |
| | Pencil hardness | | B | B | B | B | B | HB | 2B | 3B |
| | Water resistance | A | ◎ | ◎ | ◎ | ◎ | ◎ | ◎ | ◎ | ◎ |
| | Chemical resistance | B | ○ | ○ | ○ | ○ | ○ | ○ | ○ | ○ |
| | Scratch resistance | | ○ | ○ | ○ | ○ | ○ | ○ | ○ | ○ |
| Type of polyurethane resin (U) | | | U2-13 | U2-14 | U2-15 | U2-16 | U1-3 | U2'-3 | U2'-4 | U2'-5 |
| Active hydrogen component (A) | (a1) A poly carbonate diol with an Mn of 1,000 resulting from a reaction between 1,4-cyclohexanedimethanol and an ethylene carbonate | parts by mass | 316.2 | 182.4 | 158.4 | 198.5 | — | — | — | — |
| | (a2) A poly carbonate diol with an Mn of 900 resulting from a reaction between a mixture of 1,4-cyclohexanedimethanol and 1,6-hexanediol (molar ratio 50:50) and ethylene carbonate | parts by mass | — | — | 105.6 | — | 280.8 | — | — | — |
| | A poly carbonate diol with an Mn of 2,000 resulting from a reaction between a mixture of 1,4-butanediol and 1,6-hexanediol (molar ratio 70:30) and an ethylene carbonate | parts by mass | — | 78.2 | — | — | — | — | — | — |
| | A poly carbonate diol with an Mn of 2,000 resulting from a reaction between a mixture of 1,3-propanediol and 1,4-butanediol (molar ratio 50:50) and ethylene carbonate | parts by mass | — | — | — | 72.0 | — | — | — | — |
| | A poly carbonate diol with an Mn of 1,000 resulting from a reaction between a mixture of 1,4-butanediol and 1,6-hexanediol (molar ratio 70:30) and ethylene carbonate | parts by mass | — | — | — | — | — | 239.0 | — | — |
| | A poly carbonate diol with an Mn of 2,000 resulting from a reaction between 1,6-hexanediol and ethylene carbonate | parts by mass | — | — | — | — | — | — | 189.6 | — |
| | (a3) DMPA | parts by mass | 11.7 | 51.5 | 29.5 | 23.4 | 21.5 | 29.0 | 29.8 | 23.4 |
| | (a4) Ethylene glycol | parts by mass | — | 7.35 | 17.8 | 15.0 | — | — | — | 8.0 |
| | 1,3-propylene glycol | parts by mass | 17.3 | — | — | — | — | — | — | — |
| | 1,6-hexanediol | parts by mass | — | — | — | — | 11.2 | 41.0 | 27.6 | — |
| | (a5) 3-mole PO adduct of bisphenol A | parts by mass | — | 160.4 | — | — | — | — | — | — |
| | A monoamine having a ketimine bond resulting from a reaction between diethylene triamine and methyl isobutyl ketone | parts by mass | — | — | — | — | — | — | — | 238.1 |
| Organic polyisocyanate component (B) | IPDI | parts by mass | 119.1 | — | 184.5 | 181.2 | 138.4 | 178.2 | 182.9 | — |
| | MDI-H | parts by mass | — | — | — | — | — | — | — | — |

TABLE 2-continued

| | | | | | | | | | |
|---|---|---|---|---|---|---|---|---|---|
| | HDI | parts by mass | 25.5 | — | — | — | 29.6 | — | — | — |
| | MDI | parts by mass | — | — | — | — | — | — | — | 220.3 |
| Reaction solvent | Methyl ethyl ketone | parts by mass | 489.7 | 479.8 | 495.8 | 490.7 | 470.5 | 487.3 | 570.0 | 489.6 |
| Compound (X) | 3-glycidoxy propyl trimethoxy silane | parts by mass | 20.6 | 40.4 | 8.3 | — | 19.8 | 25.5 | — | 20.6 |
| | 3-glycidoxy propyl methyl dimethoxy silane | parts by mass | — | — | — | 19.2 | — | — | — | — |
| Compound (Y) | 3-aminopropyl trimethoxy silane | parts by mass | — | — | — | — | — | — | — | — |
| Properties | Mass fraction of the alicyclic hydrocarbon group contained in (a1) relative to combined mass of (A) and (B) | mass % | 17.4 | 10.2 | 19.1 | 10.9 | 16.1 | 0.0 | 11.2 | 0.0 |
| | Total content of the carboxyl group and a salt thereof attributed to (a3) present in (U) | mmol/g | 0.18 | 0.80 | 0.45 | 0.36 | 0.00 | 0.45 | 0.51 | 0.36 |
| | Combined concentration of the urethane groups and urea groups present in (U) | mmol/g | 2.5 | 3.0 | 2.8 | 2.8 | 2.8 | 2.8 | 3.2 | 3.6 |
| | Mass fraction of Si atoms attributed to the alkoxy silyl group and/or the silanol group relative to combined mass of (A) and (B) | mass % | 0.5 | 1.0 | 0.2 | 0.5 | 0.5 | 0.6 | 0 | 0.5 |
| Evaluation results | Rupture elongation | | 800 | 900 | 900 | 900 | 1200 | 1500 | 1500 | 300 |
| | Stretching conditions | | — | — | — | — | — | A | B | — |
| | Pencil hardness | | 2B | 2B | 2B | B | 2B | 4B | 4B | H |
| | Water resistance | | ⊚ | ⊚ | ⊚ | ⊚ | ⊚ | △ | △ | △ |
| | Chemical resistance | | ○ | ○ | ○ | ○ | ○ | △ | △ | △ |
| | Scratch resistance | | ○ | ○ | ○ | ○ | ○ | X | X | ○ |

Water dispersions or solvent solutions of polyurethane resins or polyurethane resin compositions obtained under working examples 1 to 23 and comparative examples 1 to 5 were subjected to measurements or evaluations of rupture elongation, pencil hardness, water resistance and chemical resistance using the methods described below. Further, decorative molded bodies were prepared and evaluated for the scratch resistance of an area ratio 0% molded product and that of an area ratio 150% molded product using the methods described below. The results are shown in Tables 1 and 2.

Rupture Elongation Measurement Method

A molding film (a dry laminate of a 100 μm-thick unstretched polyethylene terephthalate film (manufactured by Toray Industries, Inc., FL10), coated with a urethane-based adhesive (TR-7233, manufactured by Shin-Nakamura Chemical Co., Ltd.) to a post-drying thickness of 0.5 μm using a bar coater, and a 40 μm-thick unstretched polypropylene film (manufactured by Mitsui Chemicals Tohcello Inc., SC)) was coated with the sample to a thickness equivalent to a post-drying thickness of 40 μm using an applicator and dried at 80° C. for 10 minutes, and a dried film of a polyurethane resin or polyurethane resin composition was obtained as a result. After being peeled from the molding film, the dried film of a polyurethane resin or polyurethane resin composition was cut into a piece 10 mm wide and 50 mm long for use as a test specimen, which was then set on a tensile tester (manufactured by Shimazu, 100kNG) in such a manner that the tensile chucks are 20 mm apart and subjected to a tensile test at a tension speed of 200 mm/min. More specifically, the tensile test took place in a thermostatic oven set to a temperature of 100° C. after preheating the specimen for 60 seconds therein, and the percentage elongation (%) of the specimen at the rupture point was measured. The larger the rupture elongation, the more a film excels in mold-conformability when used as the protective layer of a multilayer film for decorative molding.

Pencil Hardness Measurement Method

A molding film (a dry laminate of a 100 μm-thick unstretched polyethylene terephthalate film (manufactured by Toray Industries, Inc., FL10), coated with a urethane-based adhesive (TR-7233, manufactured by Shin-Nakamura Chemical Co., Ltd.) to a post-drying thickness of 0.5 μm using a bar coater, and a 40 μm-thick unstretched polypropylene film (manufactured by Mitsui Chemicals Tohcello Inc., SC)) was coated with the sample to a thickness equivalent to a post-drying thickness of 40 μm using an applicator and dried at 90° C. for 10 minutes, and a dried film of a polyurethane resin or polyurethane resin composition was obtained as a result. In accordance with JIS K 5600: 2008, a pencil was set against the dried film surface at a 45° angle and moved about 5 mm under a 750 g downward load to scratch it, and pencil hardness was determined as the hardness of the pencil with the highest level of hardness that did not leave a scratch mark. The results are shown in Table 1. The higher the pencil hardness, the more a film excels in scratch resistance when used as the protective layer of a multilayer film for decorative molding.

Water Resistance Evaluation Method

A steel plate was coated with the sample to a thickness equivalent to a post-drying thickness of 40 μm using an applicator and dried at 90° C. for 10 minutes, and a test specimen having a side covered with a dried film of a polyurethane resin or polyurethane resin composition was obtained as a result. A drop of deionized water was then applied to the dried film surface, and the application site was covered with a 5 cm diameter petri dish to prevent the drop from evaporating. After the test piece was left to stand at 25° C. for 24 hours, the drop was removed by absorbing it with cloth, and the appearance of the dried film was evaluated by visual observation using the criteria below. The less change in appearance the dried film exhibits after the test, the more the dried film excels in water resistance when used as the protective layer of a multilayer film for decorative molding.

◎: No change
○: Becomes slightly opaque
Δ: Becomes considerably opaque
×: The film peeling off the steel plate Chemical Resistance Evaluation Method A steel plate was coated with the sample to a thickness equivalent to a post-drying thickness of 40 μm using an applicator and dried at 90° C. for 10 minutes, and a test specimen having a side covered with a dried film of a polyurethane resin or polyurethane resin composition was obtained as a result. A drop of an aqueous solution of 0.1N sodium hydroxide was then applied to the dried film surface, and the application site was covered with a 5 cm diameter petri dish to prevent the drop from evaporating. After the test piece was left to stand at 25° C. for 24 hours, the drop was removed by absorbing it with cloth, and the appearance of the dried film was evaluated by visual observation using the criteria below. The less change in appearance the dried film exhibits after the test, the more the dried film excels in chemical resistance when used as the protective layer of a multilayer film for decorative molding.

◎: No change
○: Appears slightly marked
Δ: Appears visibly marked
×: The steel plate exposed Scratch Resistance A decorative molded body was prepared by setting a multilayer film for decorative molding on the decorable object in such a manner that the adhesive layer-side of the film faces the largest face of the object and then molding it using a TOM molding machine (manufactured by Fu-se Vacuum Forming, Ltd., NGF0406-T) under the following conditions:

Molding temperature: 110° C.
Heater output: During rapid heating 200%, during normal heating 80%
Duration of rapid heating: 10 seconds
Vacuum pressure: 0 kPa
Compressed air pressure: 300 kPa
Compressed air supply duration: 15 seconds
Flash time of atmospheric release: 0 seconds (during 0% molding in area ratio), 2 seconds (during 150% molding in area ratio)

Two draw ratio conditions, condition A and condition B, were implemented for the decorating film by adjusting the depth of the box-shaped recess of the TOM molding machine. More specifically, conditions A and B were 15 mm and 85 mm, respectively, in terms of the distance from the position of the set film to the floor of the box-shaped recess. As the decorable object, a plate-shaped resin molding measuring 250 mm long×100 mm wide×3 mm thick, made of a polyolefin resin (TSOP GP6BS, manufactured by Prime Polymer Co., Ltd.), was used.

After peeling the molding film from the obtained decorative molded body, the protective layer-side scratch resistance of the decorative molded body was evaluated in accordance with JIS K 5600-5-5: 2008. With working examples 2, 3, 11 and 12, however, the protective layer-side scratch resistance of the decorative molded body was evaluated without peeling the molding film. More specifically, evaluations took place under the following conditions:

Equipment: HEIDON 14-DR (manufactured by HEIDON)
Scratch needle: Sapphire needle with 1 mm R-processed tip
Load: 200 g
Speed: 10 mm/seconds Based on a visual observation of the condition of the surface, an evaluation was made against these judgment criteria: No scratch mark on the protective layer ⊚, A scratch mark on the protective layer only ○, The protective layer penetrated only, exposing the color layer, adhesive layer or molding film (working examples 2, 3, 11 and 12 only) Δ, The protective layer, color layer, adhesive layer and molding film (working examples 2, 3, 11 and 12 only) completely penetrated, exposing the decorable object ×. Samples evaluated as ⊚ or ○ were judged to be good in scratch resistance, while those evaluated as Δ or × were judged to be unsatisfactory in scratch resistance. Each sample was measured three times, and, when measurement results differed, the worst one was adopted as the evaluation result.

INDUSTRIAL APPLICABILITY

The multilayer film for decorative can be advantageously used when decorating automobile parts and electrical appliances, but applications are not limited thereto. Namely, it can also be advantageously applied to other fields such as IT equipment, including mobile phones, notebook computers and the like, where, as well as scratch resistance, durability and other functionalities, esthetic design characteristics are required.

What is claimed is:

1. A multilayer film for decorative molding having a multilayer structure comprising a protective layer having a thickness of 20 to 50 μm, a color layer and an adhesive layer arranged in this order, with a molding film disposed between either of adjoining pairs of layers or on an opposite surface of the protective layer to the color layer, wherein the protective layer contains a polyurethane resin (U) formed at least from an active hydrogen component (A) and an organic isocyanate component (B) and having a polycarbonate skeleton with an alicyclic hydrocarbon group and condition (1) and/or condition (2) are satisfied:
   (1): the polyurethane resin (U) is a polyurethane resin (U1) having an alkoxysilyl group and/or a silanol group in a molecule,
   (2): the protective layer contains a compound (X) having a glycidyl ether group and an alkoxysilyl group and/or a silanol group, and the polyurethane resin (U) is a polyurethane resin (U2) having an amino group or a carboxyl group and/or a salt thereof.

2. The film as described in claim 1, wherein the active hydrogen component (A) contains a polycarbonate polyol (a1) having an alicyclic hydrocarbon group.

3. The film as described in claim 2, wherein the number average molecular weight of the polycarbonate polyol (a1) is 500 to 5,000 and a mass fraction of the alicyclic hydrocarbon group contained in the polycarbonate polyol (a1) is 1 to 30 mass% relative to the combined mass of the active hydrogen component (A) and the organic isocyanate component (B).

4. The film as described in claim 1, wherein the combined mass fraction of the Si atoms attributed to the alkoxy silyl group and/or the silanol group contained in the polyurethane resin (U) and the Si atoms attributed to the alkoxy silyl group and/or the silanol group contained in the compound (X) is 0.05 to 2.0 mass% relative to the combined mass of the active hydrogen component (A) and the organic isocyanate component (B).

5. The film as described in claim 1, wherein the organic isocyanate component (B) comprises an alicyclic polyisocyanate (b 1) with a carbon number of 6 to 18 and/or an aliphatic polyisocyanate (b2) with a carbon number of 4 to 22.

6. The film as described in claim 1, wherein the organic isocyanate component (B) comprises isophorone diisocyanate and/or 4,4-dicyclohexyl methane diisocyanate.

* * * * *

UNITED STATES PATENT AND TRADEMARK OFFICE
CERTIFICATE OF CORRECTION

PATENT NO. : 10,000,667 B2
APPLICATION NO. : 15/479436
DATED : June 19, 2018
INVENTOR(S) : Minomo et al.

It is certified that error appears in the above-identified patent and that said Letters Patent is hereby corrected as shown below:

In the Specification

In Column 39
At Line 10, please change "A" to -- Δ --.

Signed and Sealed this
Sixth Day of November, 2018

Andrei Iancu
*Director of the United States Patent and Trademark Office*